(12) United States Patent
Jewell

(10) Patent No.: US 11,738,820 B2
(45) Date of Patent: Aug. 29, 2023

(54) TOOL-LESS BICYCLE ACCESSORIES AND ASSOCIATED METHODS

(71) Applicant: Huffy Corporation, Miamisburg, OH (US)

(72) Inventor: Jason Jewell, Dayton, OH (US)

(73) Assignee: Huffy Corporation, Miamisburg, OH (US)

( * ) Notice: Subject to any disclaimer, the term of this patent is extended or adjusted under 35 U.S.C. 154(b) by 366 days.

(21) Appl. No.: 16/847,897

(22) Filed: Apr. 14, 2020

(65) Prior Publication Data

US 2020/0369339 A1  Nov. 26, 2020

Related U.S. Application Data

(60) Provisional application No. 62/852,015, filed on May 23, 2019.

(51) Int. Cl.
*B62J 9/27* (2020.01)
*B62J 15/02* (2006.01)
*B62J 9/21* (2020.01)

(52) U.S. Cl.
CPC . *B62J 9/27* (2020.02); *B62J 9/21* (2020.02); *B62J 15/02* (2013.01)

(58) Field of Classification Search
CPC ......... B62J 9/27; B62J 9/21; B62J 9/00; B62J 9/20; B62J 15/00; B62J 15/02
See application file for complete search history.

(56) References Cited

U.S. PATENT DOCUMENTS

| 896,580 | A | * | 8/1908 | Robeson et al. ......... B62J 15/00 280/852 |
| 1,379,305 | A | | 5/1921 | Johns |
| 1,514,720 | A | | 11/1924 | Pauly |
| 1,531,916 | A | | 3/1925 | Flintjer |
| 1,653,583 | A | | 12/1927 | Paxson |
| 2,481,837 | A | | 9/1949 | Giese |
| D158,455 | S | | 5/1950 | Glamb |
| D176,037 | S | | 11/1955 | Rhoades |
| 3,158,964 | A | | 12/1964 | Haas |
| 4,079,957 | A | | 3/1978 | Blease |
| 4,657,270 | A | | 4/1987 | Allen et al. |
| 4,958,842 | A | | 9/1990 | Chang |

(Continued)

FOREIGN PATENT DOCUMENTS

| CN | 101519107 A | 9/2009 |
| GB | 2263258 A | 7/1993 |

(Continued)

*Primary Examiner* — James M Dolak
(74) *Attorney, Agent, or Firm* — Wood Herron & Evans LLP

(57) ABSTRACT

A bicycle including a main frame, a steering assembly coupled to the main frame, a front wheel coupled to the steering assembly and a bicycle accessory assembly coupled to the bicycle, such as the steering assembly. The bicycle accessory assembly includes a bicycle accessory and a first tool-less connector for connecting the bicycle accessory to the bicycle in a tool-less manner. The second tool-less connector may be used to secure the bicycle accessory to the bicycle. A method of connecting a bicycle accessory assembly to a bicycle is also disclosed.

12 Claims, 20 Drawing Sheets

(56) References Cited

U.S. PATENT DOCUMENTS

| | | | |
|---|---|---|---|
| 5,275,427 A * | 1/1994 | Gasser | B62J 15/00 |
| | | | 280/852 |
| D355,870 S | 2/1995 | Dieudonne | |
| 5,440,950 A | 8/1995 | Tranvoiz | |
| 5,441,289 A | 8/1995 | Spielberger | |
| 5,904,361 A * | 5/1999 | Powell | B62J 15/02 |
| | | | 280/152.1 |
| 6,331,011 B1 * | 12/2001 | Feldmann | B62J 15/00 |
| | | | 280/852 |
| 6,435,533 B1 * | 8/2002 | Chuang | B62J 15/00 |
| | | | 403/370 |
| 6,443,033 B1 | 9/2002 | Brummer et al. | |
| 6,446,994 B1 * | 9/2002 | Smerdon, Jr. | B62J 15/00 |
| | | | 280/852 |
| 6,612,201 B1 | 9/2003 | Chen | |
| 6,685,206 B1 | 2/2004 | Blake | |
| 6,685,207 B1 | 2/2004 | Blake | |
| 6,695,327 B1 | 2/2004 | Maggiore et al. | |
| 6,705,813 B2 | 3/2004 | Schwab | |
| 6,708,998 B1 | 3/2004 | Blake | |
| D494,509 S | 8/2004 | Chiappetta et al. | |
| 6,783,314 B2 | 8/2004 | Gattone | |
| D518,417 S | 4/2006 | Oosterveer | |
| D525,568 S | 7/2006 | Baron | |
| 7,080,574 B2 | 7/2006 | Chang | |
| 7,188,849 B2 | 3/2007 | Lee | |
| 7,226,065 B2 | 6/2007 | Hutson | |
| 7,455,308 B2 | 11/2008 | Michelau et al. | |
| 7,487,982 B2 | 2/2009 | Chan | |
| D589,851 S | 4/2009 | Jane Santamaria | |
| D594,788 S | 6/2009 | Hartlaub et al. | |
| 7,572,199 B1 | 8/2009 | Calendrille, Jr. | |
| 7,793,747 B2 * | 9/2010 | Brown | B62J 7/04 |
| | | | 180/219 |
| D630,158 S | 1/2011 | Jessie, Jr. | |
| 7,976,041 B2 * | 7/2011 | Chuang | B62J 15/02 |
| | | | 280/848 |
| 8,172,246 B2 * | 5/2012 | Bybee | B62J 15/02 |
| | | | 280/852 |
| 8,262,114 B2 * | 9/2012 | Jessie, Jr. | B62K 9/02 |
| | | | 74/551.8 |
| 8,408,094 B2 | 4/2013 | Chen | |
| 8,657,317 B2 * | 2/2014 | Syu | F16B 21/125 |
| | | | 403/324 |
| 8,985,416 B2 * | 3/2015 | Schanz | B62J 7/04 |
| | | | 224/413 |
| 11,230,337 B2 * | 1/2022 | Serotta | B62J 15/02 |
| 2001/0035626 A1 | 11/2001 | Kettler | |
| 2003/0052471 A1 | 3/2003 | Grafton | |
| 2004/0061304 A1 | 4/2004 | Lim | |
| 2006/0186641 A1 | 8/2006 | Chan | |
| 2008/0179850 A1 | 7/2008 | Catelli | |
| 2010/0289244 A1 | 11/2010 | Grossman | |
| 2011/0315728 A1 * | 12/2011 | Ghormley | B62J 9/23 |
| | | | 224/413 |

FOREIGN PATENT DOCUMENTS

| | | |
|---|---|---|
| JP | 571089 | 9/1993 |
| JP | 2000142526 | 5/2000 |

* cited by examiner

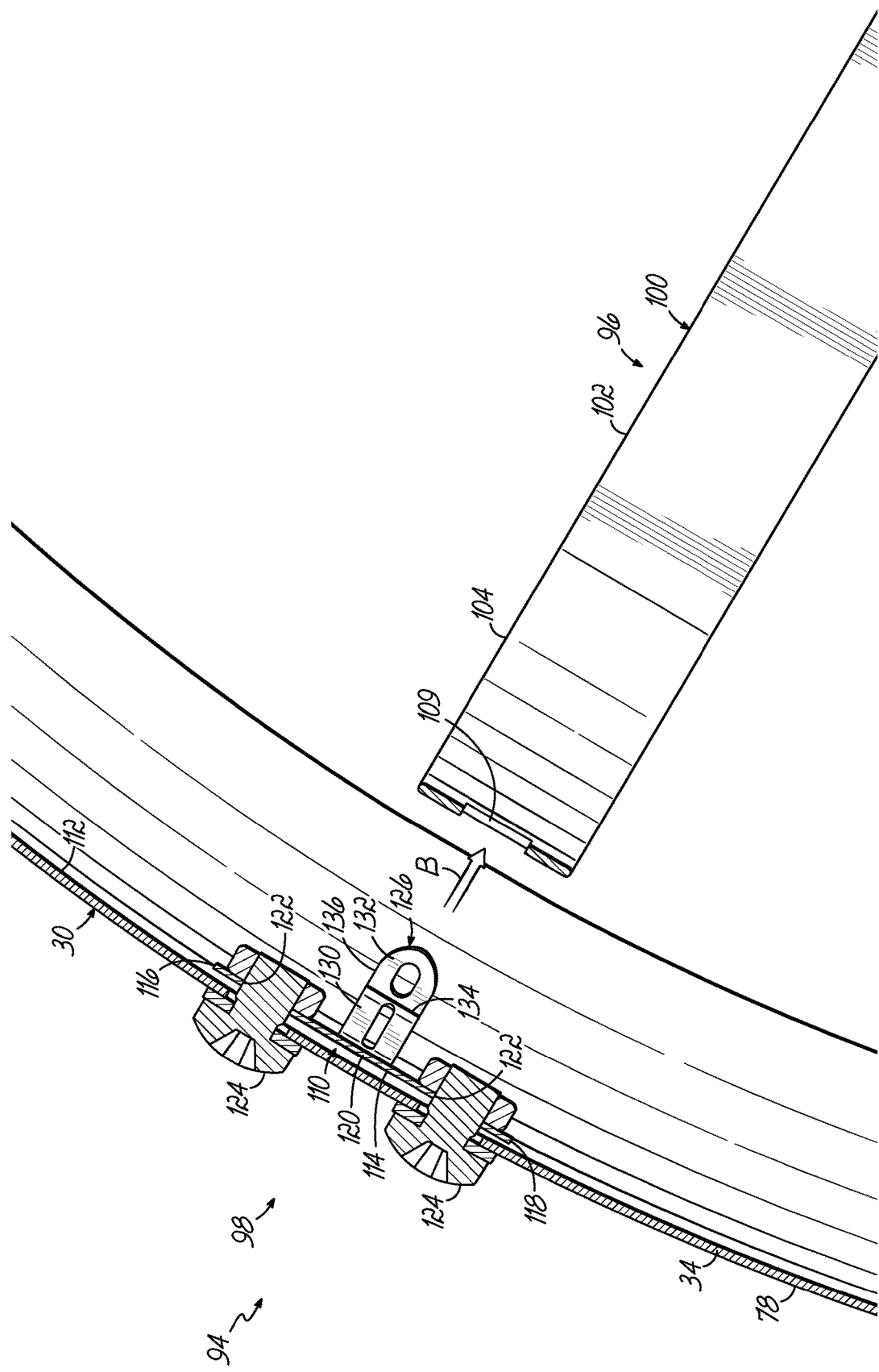

TOOL-LESS BICYCLE ACCESSORIES AND ASSOCIATED METHODS

CROSS REFERENCE TO RELATED APPLICATION

This application claims priority to U.S. Provisional Patent Application No. 62/852,015 filed on May 23, 2019, the disclosure of which is incorporated by reference herein in its entirety.

TECHNICAL FIELD

The invention relates generally to bicycles, and more particularly to the assembly of various accessories to the bicycle in a tool-less manner.

BACKGROUND

Bicycles are among some of the most popular of today's outdoor toys for children and adults. Such bicycles are typically manufactured and shipped to various retail outlets for offering to end consumers. More recently, consumers have been purchasing bicycles directly from the manufacturer or from online retail outlets. In any event, manufacturers attempt to package the bicycle in an efficient and cost-effective manner. This often requires that various components of the bicycle be packaged in an unassembled state such that subsequent assembly is required before the consumer may use the bicycle. By way of example, the wheels, handlebars, pedals, fenders, and other add-on features, such as a basket for example, may not come assembled to the bicycle. While some retail outlets may offer a service of assembling the bicycle for the consumer, in many cases assembly of the bicycle is being left to the end consumer.

Conventional assembly often requires a plethora of tools, such as wrenches, screw drivers, etc., for assembling the bicycle. Accordingly, proper assembly relies on the consumer having the proper tools readily accessible. It can be frustrating when the consumer starts assembling the bicycle but then learns that they lack the proper tools required to complete the assembly. Moreover, proper assembly of the bicycle may be heavily dependent on the particular skill set of the person performing the assembly. Thus, even with the correct tools, proper assembly of the bicycle may not be achieved. The improper assembly of the bicycle may frustrate the consumer and result in negative product perception, phone calls or other communications from unsatisfied consumers at call-in or technical centers, or product return and a demand for a refund.

In view of the above, there is an increasing need for manufacturers to provide bicycles that are easy to assemble and require a minimum number of tools.

SUMMARY

A bicycle including a main frame, a steering assembly coupled to the main frame, a front wheel coupled to the steering assembly and a bicycle accessory assembly is disclosed. The bicycle accessory assembly includes a bicycle accessory and a first tool-less connector for connecting the bicycle accessory to the bicycle in a tool-less manner. In one embodiment, the bicycle may further include a second tool-less connector for connecting the bicycle accessory to the bicycle in a tool-less manner. Thus, the bicycle accessory may be coupled to the bicycle with at least one, and possible two connectors that operate in a tool-less manner In one embodiment, the bicycle accessory assembly is a fender assembly including a fender and the first tool-less connector. The first tool-less connector includes a bicycle connection portion on the bicycle and a fender connection portion on the fender. In one embodiment, the bicycle connection portion includes a bracket with a spring clip on the steering assembly and the fender connection portion includes a hood. The spring clip includes a flexible tongue and the hood includes an interior cavity, a first opening, and a second opening. When the fender is assembled to the bicycle, the bracket is received in the interior cavity of the hood through the first opening and the flexible tongue of the spring clip is received through the second opening of the hood to secure the fender to the bicycle. In one embodiment, the hood may be integrally formed in the fender, such as through a stamping process.

The fender assembly may include a second tool-less connector for connecting the fender to the bicycle in a tool-less manner. Similar to the above, the second tool-less connector includes a bicycle connection portion on the bicycle and a fender connection portion on the fender. In one embodiment, the bicycle connector portion includes a support frame on the steering assembly and the fender connection portion includes spring clip. The support frame includes two legs and an intermediate portion having an opening, and the spring clip includes at least one flexible arm. When the fender is assembled to the bicycle, the at least one flexible arm is received in the opening in the intermediate portion of the support frame to secure the fender to the bicycle. In one embodiment, the spring clip includes two flexible arms and each flexible arm may be received in the opening in the intermediate portion of the support frame when the fender is assembled to the bicycle. In one arrangement, the at least one flexible arm is generally parallel to the fender and flexes in a direction generally perpendicular to the fender. In another arrangement, the at least one flexible arm is generally perpendicular to the fender and flexes in a direction generally perpendicular to the fender.

In another embodiment, the bicycle accessory assembly is a basket assembly including a basket and the first tool-less connector. The first tool-less connector includes a bicycle connection portion on the bicycle and a basket connection portion on the bicycle. In one embodiment, the bicycle connection portion includes a bracket having one or more studs and the basket connection portion includes a connector plate having one or more slots for receiving the one or more studs. The bracket may be coupled to the steering assembly and the connector plate may be coupled to a sidewall of the basket in one embodiment.

The basket assembly may include a second tool-less connector for connecting the basket to the bicycle in a tool-less manner. The second tool-less connector includes a bicycle connection portion on the bicycle and a basket connection portion on the basket. In one embodiment, the bicycle connection portion includes a support frame on the steering assembly and the basket connection portion includes a connector plate. The support frame includes two legs and an intermediate portion having a tab and the connector plate defines an internal cavity having an opening and a flexible tongue positioned in the internal cavity. When the basket is assembled to the bicycle, the tab is received in the internal cavity through the opening and secured therein by the flexible tongue.

In yet another embodiment, a method of coupling a bicycle accessory assembly to a bicycle is disclosed. The method includes providing a bicycle and a bicycle accessory assembly and connecting the bicycle accessory assembly to the bicycle using a first tool-less connector. The method may further include connecting the bicycle accessory assembly to the bicycle using a second tool-less connector. In one embodiment, the bicycle accessory assembly includes a fender assembly. In another embodiment, the bicycle accessory assembly includes a basket assembly.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 4A-4C are partial cross-sectional views of a second tool-less connector for coupling the fender to the bicycle;

DETAILED DESCRIPTION

Aspects of the present disclosure are directed to the tool-less assembly of various bicycle components. More particularly, aspects of the disclosure are directed to the tool-less assembly of a fender and a basket for a bicycle. As described above, these features may not come pre-assembled to the bicycle but require some amount of assembly by the retail outlet or the end consumer. In this regard, FIGS. 1-6C illustrate the elements and steps for achieving a tool-less assembly of a bicycle fender in accordance with embodiments of the invention. FIGS. 7-10C then illustrate the elements and steps for achieving a tool-less assembly of a bicycle basket in accordance with an embodiment of the invention. While aspects of the present invention will be described herein in the context of a bicycle, it should be appreciated that other child vehicles, such as tricycles, ride-ons, or the like, having similar components may also benefit from aspects of the invention.

Figure 1:
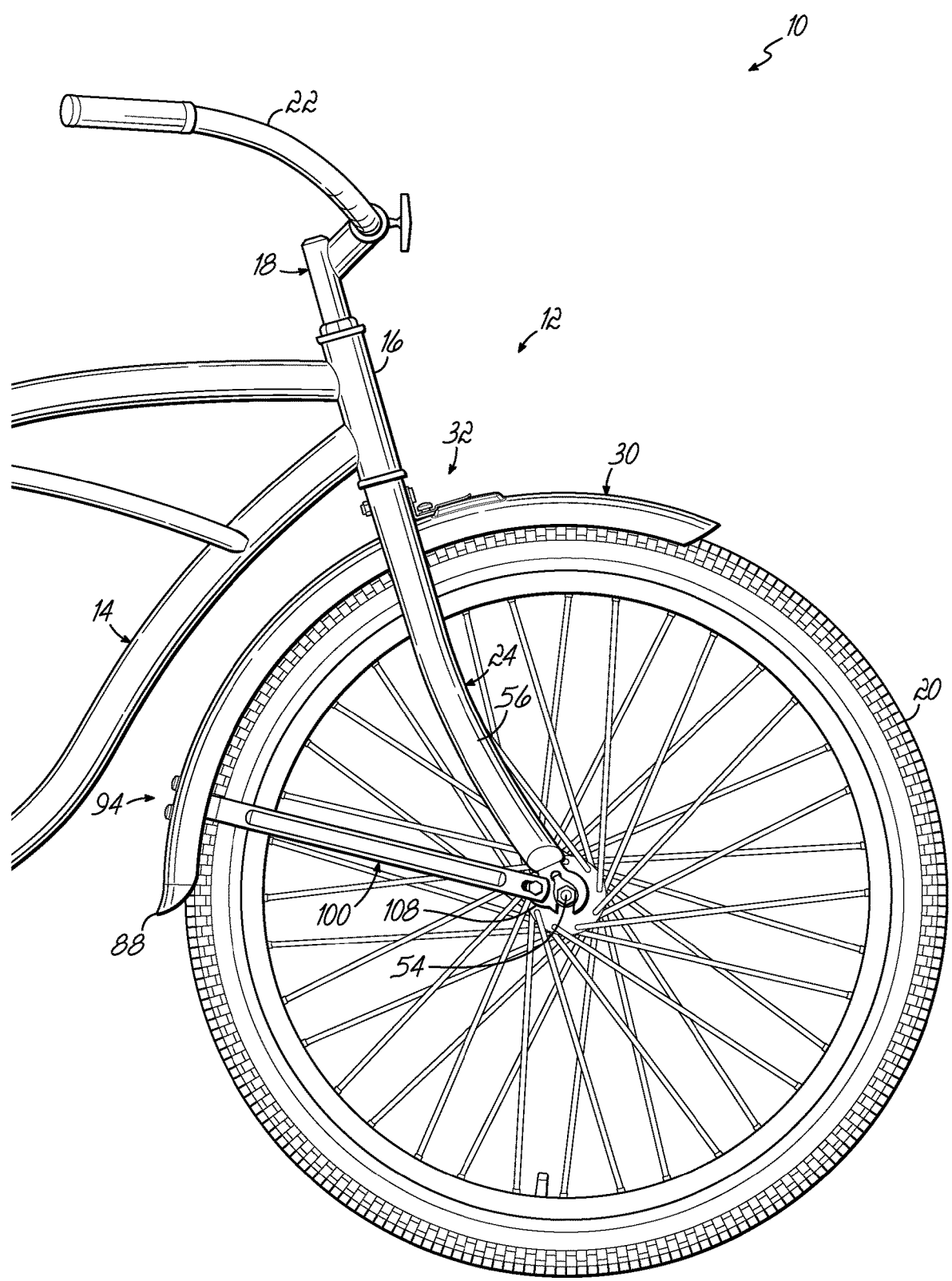
FIG. 1 is a partial side view of a bicycle having a tool-less fender assembly in accordance with an embodiment of the invention.

Referring now to the drawings and to FIG. 1 in particular, a bicycle 10 having a tool-less fender assembly 12 is shown. As in conventional designs, the bicycle 10 generally includes a main frame 14 having a head tube 16 configured to receive a rotatable steering assembly 18 coupled to a front wheel 20 for guiding the bicycle 10 in a desired direction. The steering assembly 18 includes a handlebar 22 configured to be grasped or engaged by the rider and a front fork 24 coupled to the handlebar 22 and to which the front wheel 20 is coupled. In an exemplary embodiment, the bicycle 10 includes a front fender assembly 12. The front fender assembly 12 may provide a number of functions to the bicycle 10. For example, the front fender assembly 12 may operate as a splash guard to prevent or minimize mud, rocks and/or water spray from coming back onto the rider of the bicycle 10. Additionally, the fender assembly 12 may be considered desirable by many consumers for improving the overall aesthetics of the bicycle 10.

Figure 2:
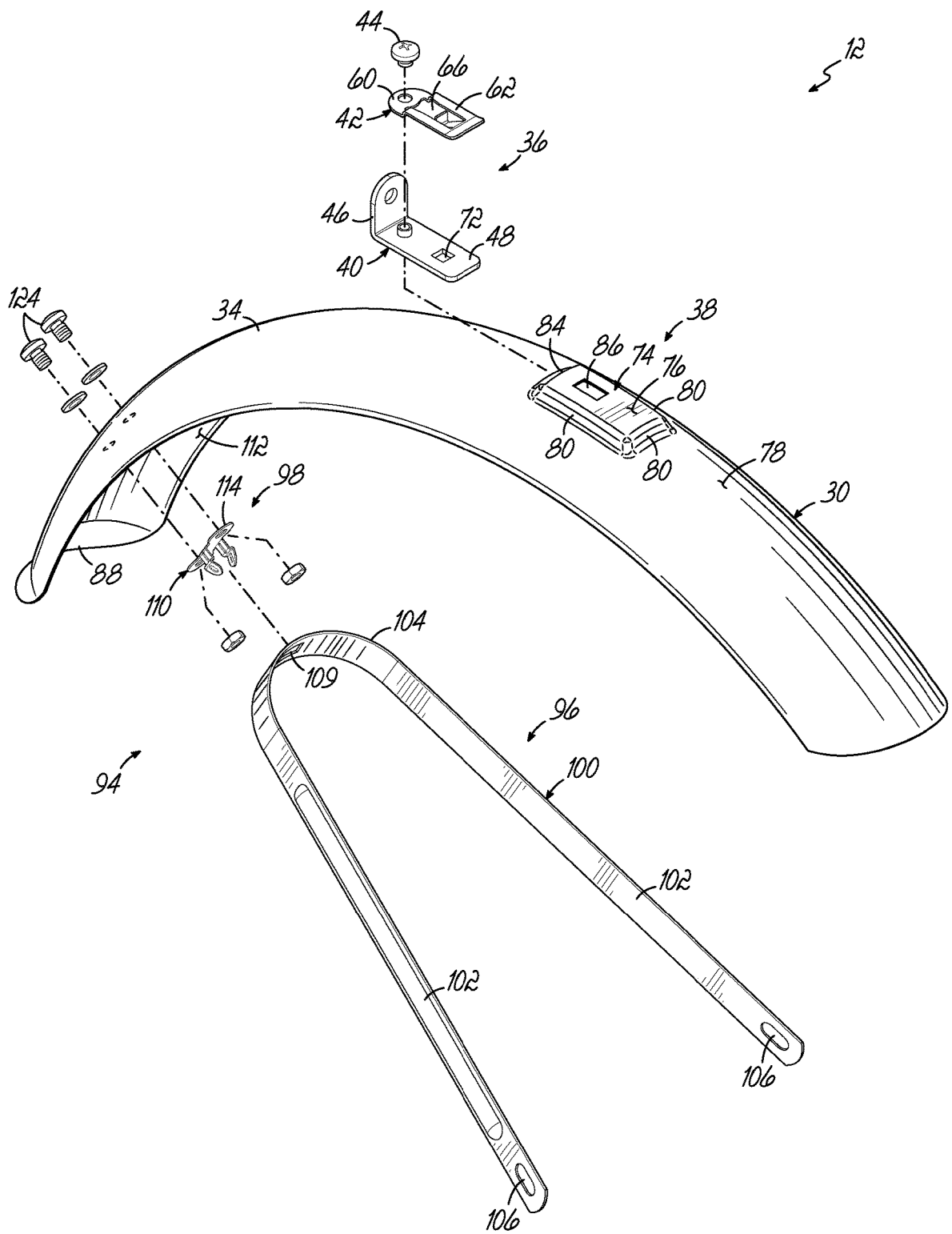
FIG. 2 is a disassembled view of the tool-less fender assembly illustrated in FIG. 1.

In one embodiment and as illustrated in FIGS. 1 and 2, the fender assembly 12 includes a fender 30 and at least one tool-less connector 32 (referred to herein as the first tool-less connector) for coupling the fender 30 to the bicycle 10, and more particularly to the steering assembly 18 thereof. The fender 30 may generally include an arcuate elongate body 34 having a radius of curvature similar to that of the front wheel 20 so that the fender 30 may generally follow the contour of the front wheel 20 (e.g., see the side view of FIG. 1). Additionally, the fender 30 may be generally concave in cross section (from the reference frame shown in FIG. 1) so as to match the rounded, generally convex shape of the front wheel 20. The length of the fender 30 may vary depending on the particular application. By way of example, however, the fender 30 should have a length sufficient to cover between about 15% and about 40% of the circumference of the front wheel 20, and preferably between about 25% to about 30% of the circumference of the front wheel 30. In one embodiment, the fender 30 may be formed from a suitable metal, such as aluminum or steel. Alternatively, however, the fender 30 may be formed from a durable plastic or other suitable material.

The first tool-less connector 32 includes a bike connector portion 36 and a fender connector portion 38, wherein the two portions 36, 38 cooperate to couple the fender 30 to the bicycle 10 in a tool-less manner. In this regard, the bike connector portion 36 includes a bracket 40 and a spring clip 42 mounted to the bracket 40 via a fastener 44, such as a screw or the like. In one embodiment, the bracket 40 may be configured as an L-shaped bracket having a first leg 46 and a second leg 48 extending generally orthogonally therefrom. The bracket 40 may be mounted to the steering assembly 18 in an exemplary embodiment. More particularly, the first leg 46 of the bracket 40 may be coupled to a front surface 50 of the front fork 24 via a fastener 52, such as a screw of the like. The second leg 48 projects away from the front surface 50 and may be positioned adjacent the upper portion of the opening 54 between the two legs 56 of the front fork 24. This position is configured to be adjacent and above the front wheel 20 when the front wheel is coupled to the bicycle 10.

Figure 3A:
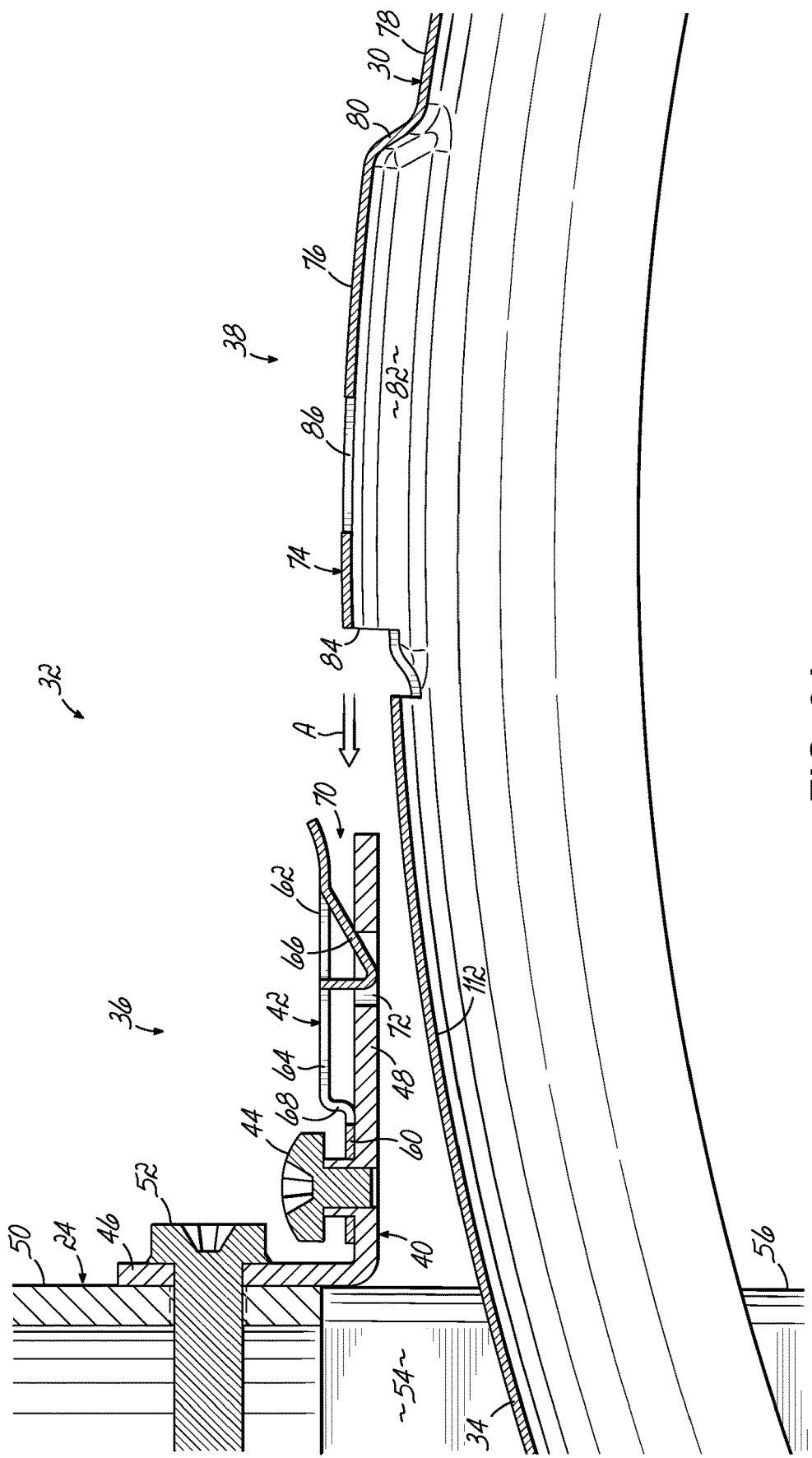
FIGS. 3A-3C are partial cross-sectional views of a first tool-less connector for coupling a fender to the bicycle.

As illustrated in FIG. 2, the spring clip 42 may be attached to an upper surface of the second leg 48 of the bracket 40 by fastener 44. The spring clip 42 includes a base 60 having an aperture for receiving the fastener 44, a U-shaped tab 62 coupled to the base 60 and defining an aperture 64, and a flexible tongue 66 coupled to the U-shaped tab and extending into the aperture 64. The U-shaped tab 62 includes a pair of struts having one end thereof coupled to the base and a cross bar at an opposite end thereof. The aperture 64 may be defined between the base 60, struts, and cross bar. The tongue 66 may be generally J-shaped and have one end coupled to the cross bar of the U-shaped member 62. In an unbiased state, the flexible tongue 66 depends downwardly and out of the plane of the struts and cross bar (as shown in FIG. 2). However, the tongue 66 may be flexed upwardly by the application of a sufficient force (from the reference frame shown in FIG. 2) so that the tongue 66 extends into the aperture 64 by a lesser amount. As illustrated in FIG. 3A, when the spring clip 42 is coupled to the bracket 40, the U-shaped member 62 is slightly spaced from the upper surface of the second leg 48 of the bracket 40 by an offset 68 to define a slot 70 therebetween, and the tongue 66 extends downwardly into an aperture 72 in the second leg 48 of the bracket 40 when coupled together and the tongue 66 is in its unbiased or base state.

As illustrated in FIGS. 2 and 3A, the fender connector portion 38 includes a hood 74 formed in or attached to the fender 30. For example, in one embodiment, the hood 74 may be stamped into the fender 30 and thus integrally formed with the fender 30. In an alternative embodiment, however, the hood 74 may be a separate element which is subsequently coupled to a formed fender 30. In any event, the hood 74 includes an upper surface 76 offset from the upper surface 78 of the fender 30 by a plurality of sidewalls 80 (e.g., three sidewalls) to define an interior cavity 82. The rear side of the hood 74 includes an opening 84 for accessing the interior cavity 82 of the hood 74. The upper surface 76 of the hood 74 includes an aperture 86, the purpose of which will be explained in more detail below.

Operation of the first tool-less connector 32 for coupling the fender 30 to the bicycle 10 will now be described in detail with reference to FIGS. 3A-3C. In one embodiment, when a consumer receives the packaged bicycle, the bike connector portion 36 will come pre-assembled on the bicycle 10 from the factory. Thus, the spring clip 42 will come assembled to the bracket 40 and the bracket 40 will come assembled to the front surface 50 of the front fork 24. However, the fender 30 will not come pre-assembled from the factory and the consumer will have to attach the fender 30 to the bicycle 10. To do this, the consumer will orient the fender 30 and insert the rear end 88 of the fender 30 between the legs 56 of the front fork 24 from the front, illustrated by arrow A in FIG. 3A. As the fender 30 is moved between the legs 56 of the front fork 24, the upper surface 78 of the fender 30 should be positioned below the bracket 40 while the upper surface 76 of the hood 74 should be aligned with the opening 70 between the second leg 48 of the bracket 40 and the U-shaped tab 62. The end of the U-shaped tab 62 may be slightly curved (e.g., upwardly) to provide a tapered inlet for opening 70 (see FIG. 3A). This also means that the second leg 48 of the bracket 40 is aligned with the opening 84 in the hood 74. The tongue 66 is in its unbiased or base position and has a portion extending into the aperture 86 in the second leg 48 of the bracket 40.

Figure 3B:
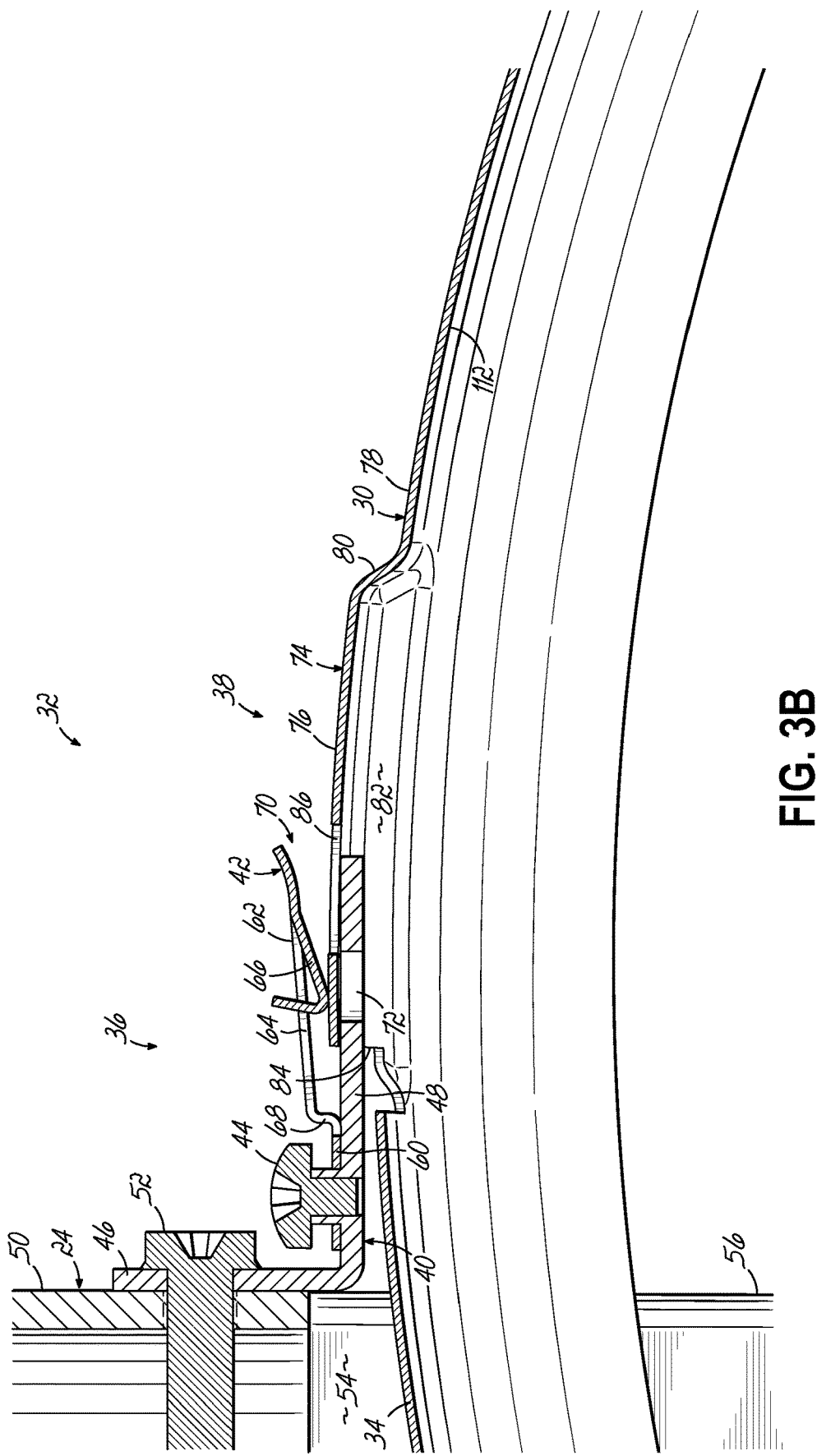

As illustrated in FIG. 3B, as the fender 30 is further moved through the legs 56 of the front fork 24, the upper surface 76 of the hood 74 engages the tongue 66 and flexes the tongue 66 upwardly (e.g., through a camming action) such that the tongue 66 slides along the upper surface 76 of the hood 74. At the same time, the second leg 48 of the bracket 40 extends through the opening 84 in the hood 74 and is received in the interior cavity 84 defined thereby. With further movement of the fender 30, and as illustrated in FIG. 3C, the tongue 66 encounters the aperture 86 in the upper surface 76 of the hood 74 and drops back down under to its own bias so as to extend through the aperture 86 in the hood 74 and into the aperture 72 in the second leg 48 of the bracket 40. With this snap-fit, the fender 30 is secured to the bicycle 10 and further movement of the fender 30 relative to the bicycle 10 is substantially restricted.

Figure 3C:
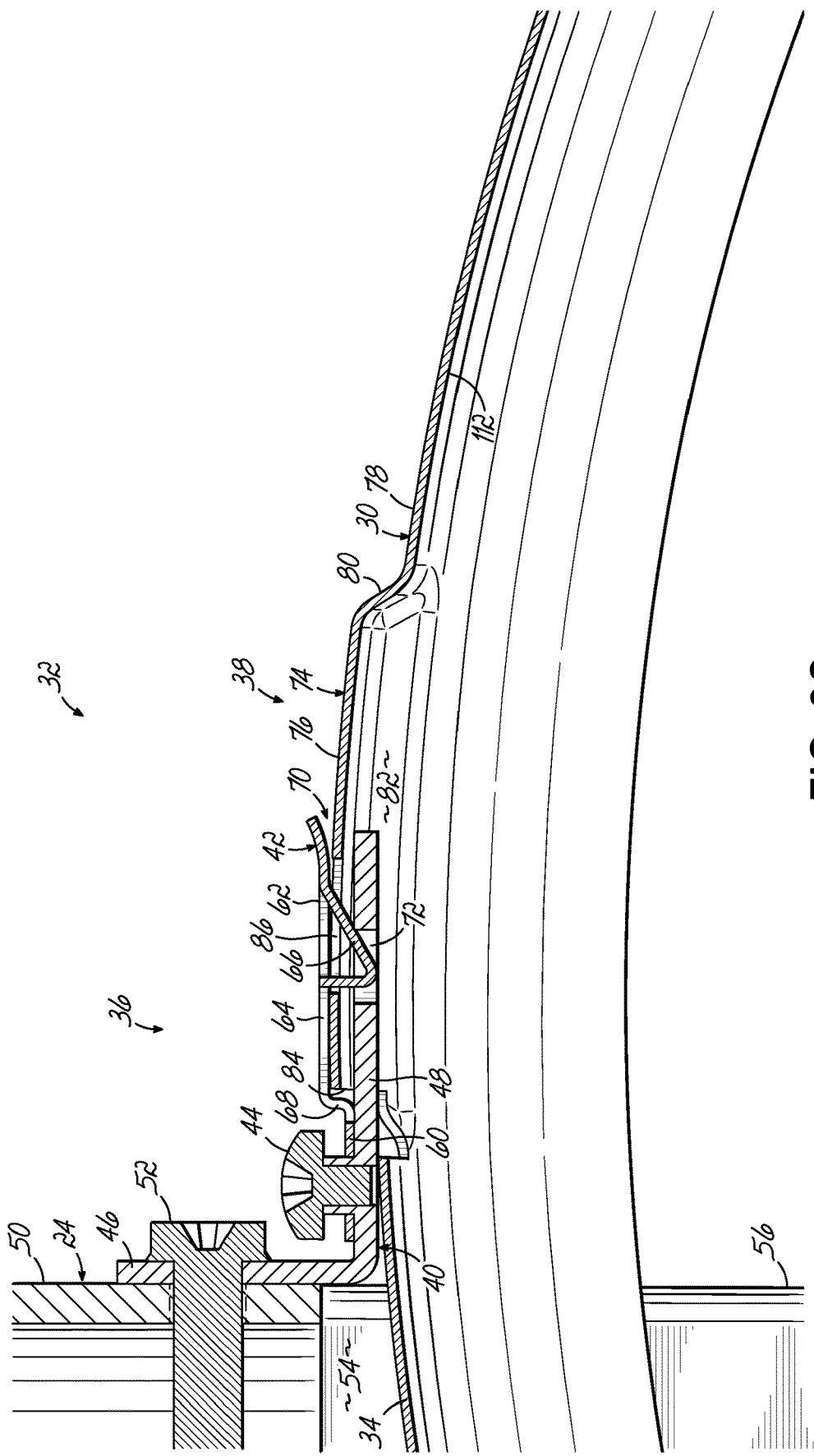

For example, should the consumer try to continue moving the fender 30 in the rearward direction, the front end of the hood 74 adjacent the opening 84 will contact the wall created by the offset 68 defined by the spring clip 42 (e.g., see FIG. 3C). Should the consumer attempt to move the fender 30 in the forward direction (e.g., opposite to the insertion direction shown by arrow A), a front edge of the aperture 86 will engage a leg of the J-shaped tongue 66 and restrict movement of the fender 30 in the forward direction. Once the fender 30 is coupled to the bicycle 10, it is intended to remain attached to the bicycle 10. However, should one want to remove the fender 30 from the bicycle 10, it can be done. As best illustrated in FIG. 3C, to remove the fender 30, the consumer may, with his or her finger or with a suitable tool (e.g., a screwdriver), press the tongue 66 from the underside of the fender 30 to flex the tongue 66 upwardly and back through the aperture 86 in the hood 74. Once the tongue 66 has cleared the aperture 86, the consumer may then pull the fender 30 in the forward direction (e.g., opposite to the direction of arrow A) until the bracket 40 no longer engages with the hood 74, at which point the fender 30 may be separated from the bicycle 10.

While in certain applications, it may be sufficient to include only one tool-less connection with the fender assembly 12, in an exemplary embodiment, the fender assembly 12 may further include a second means for coupling the fender 30 to the bicycle 10. Depending on the length of the fender 30, for example, this may improve the securement of the fender 30 to the bicycle 10. In this regard, the fender assembly 12 may include a second tool-less connector 94 for coupling the fender 30 to the bicycle 10. The second tool-less connector 94 includes a bike connector portion 96 and a fender connector portion 98, wherein the two portions 96, 98 cooperate to couple the fender 30 to the bicycle 10 in a tool-less manner. In this regard, the bike connector portion 96 includes a support frame 100 having a pair of generally opposed, spaced-apart legs 102 and a bend portion 104 coupling one end of the legs 102. The opposite ends of the legs 102 are free ends and include an aperture 106 for coupling the support frame 100 to the bicycle 10, and more particularly to the steering assembly 18 thereof.

As illustrated in FIG. 1, the free ends of the support frame 100 may be configured to couple to the front fork 24 adjacent to where the front wheel 20 is configured to attach. In an exemplary embodiment, the front fork 24 may include eyelets 108 to which the ends of the support frame 100 may be coupled by a suitable fastener, such as a nut and bolt. In an alternative embodiment, the free ends of the support frame 100 may be configured to couple to the bicycle 10 as part of the coupling of the front wheel 20 to the bicycle 10. For example, the apertures 106 at the free ends of the support frame 100 may be placed around the axle 54 of the front wheel 20 and coupled to the bicycle 10 using the nuts, quick-release or other connector that secures the front wheel 20 to the bicycle 10 (not shown). Moreover, the bend portion 104 of the support frame 100 includes an aperture 109, the purpose of which will be explained in more detail below.

As shown in FIG. 2, the fender connector portion 98 includes a spring clip 110 configured to be coupled to the lower surface 112 of the fender 30. The spring clip 110 is configured to couple to the fender 30 in a direction toward the rear end 88 of the fender 30 relative to the hood 74. The spring clip 110 includes an elongate body 114 having first and second opposed ends 116, 118 and an intermediate portion 120 disposed therebetween. Each of the ends 116, 118 includes an aperture 122 for receiving a fastener 124 for securing the spring clip 110 to the lower surface 112 of the fender 30. The intermediate portion 120 of the body 114 includes a pair of flexible spring arms 126, 128 projecting downwardly (from the perspective shown in FIG. 2) from side edges of the body 114. In an exemplary embodiment, the spring arms 126, 128 may be integrally formed with the spring clip 110. Alternatively, the spring arms 126, 128 may be separately formed and coupled to the spring clip 110. In one embodiment, the elongate body 114 may have a bone-shaped configuration with rounded ends connected by a thinner intermediate section. Other shapes of the elongate body 114, however, are also possible and aspects of the invention should not be limited to the particular arrangement shown in the figures. The spring clip 110 may be formed from metal or a suitable plastic material.

Figure 4B:
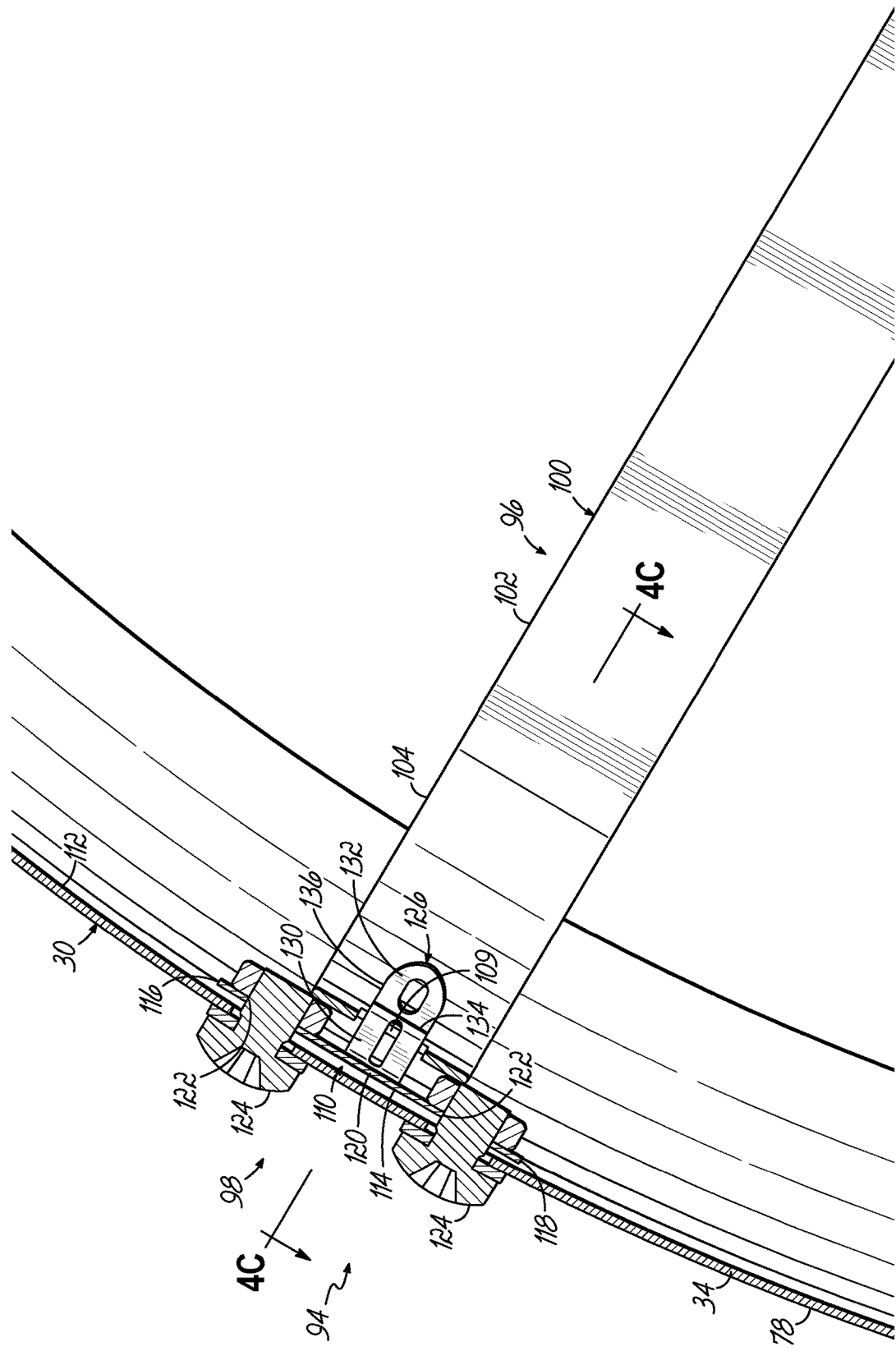
Figure 4C:
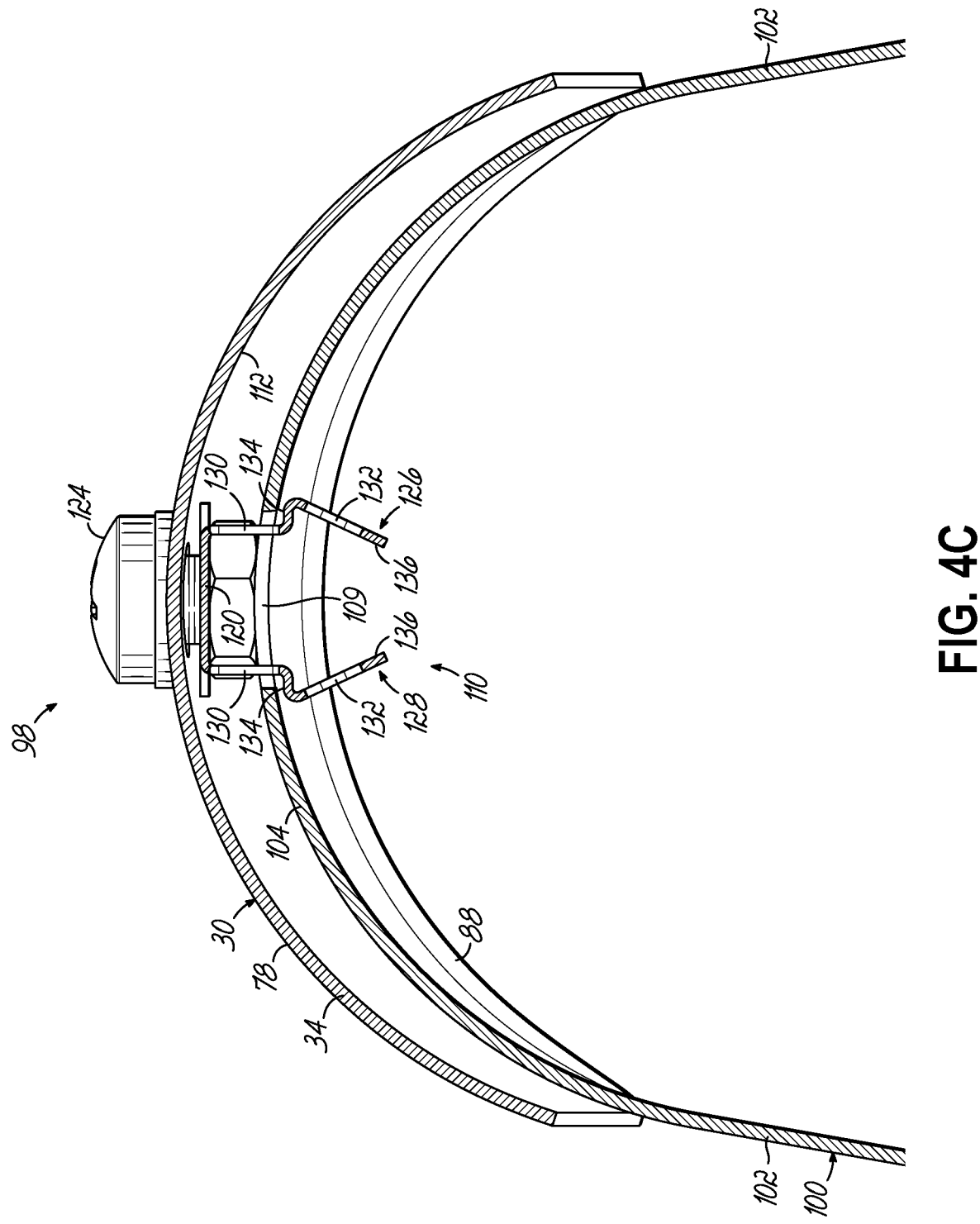

As shown in FIGS. 2 and 4C, each of the spring arms 126, 128 includes a lower arm portion 130 having an end coupled to the sides of the intermediate portion 120 of the spring clip 110. The lower arm portions 120 may extend from the intermediate portion 120 at about 90 degrees in an exemplary embodiment. An upper end of the lower arm portions 130 are coupled to respective J-shaped upper arm portions 132. The upper arm portions 132 have a first, shorter leg 134 coupled to the lower arm portions 130 so as to be directed away from each other (see FIG. 4C). A second, longer leg 136 extends from the first leg 134 at an angle so as to be angled toward each other (see FIG. 4C). The spring arms 126, 128 are flexible and generally capable of flexing toward and away from each other, such as in a width direction of the fender 30 when the spring clip 110 is coupled thereto.

Operation of the second tool-less connector 94 for coupling the fender 30 to the bicycle 10 will now be described in detail with reference to FIGS. 4A-4C. In one embodiment, when the consumer receives the packaged bicycle, the bike connector portion 96 will come pre-assembled on the bicycle from the factory. Thus, the free ends of the support frame 100 will be coupled to the eyelets 108 on the front fork 24 of the steering assembly 18, such as by a suitable fastener. The fastening may be such as to allow the support frame 100 to be pivotable about the eyelets 108. In this way, when packaged, the legs 102 of the support frame 100 may be arranged adjacent and generally parallel to the legs 56 of the front fork 24. However, when the consumer is ready to assemble the fender 30 to the bicycle 10, the support frame 100 may be rotated away from the front fork 24 and in a position to connect to the spring clip 110. Furthermore, when the consumer receives the packaged bicycle, the spring clip 110 will come pre-assembled to the lower surface 112 of the fender 30 via the pair of fasteners 124, such as a pair of nuts and bolts, which are received through a pair of apertures in the fender 30 and the apertures 122 in the spring clip 110. Again, however, the fender 30 will not come pre-assembled from the factory and the consumer will have to attach the fender 30 to the bicycle 10.

This process was described above for the first too-less connector 32. During that process, and when the hood 74 is adjacent the bracket 40, the bend portion 104 of the support frame 100 is configured to be adjacent the spring clip 110 on the fender 30. As the fender 30 is being inserted between the legs 56 of the front fork 24, the fender 30 is configured to be above the support frame 100 such that the lower surface 112 of the fender 30 generally confronts the outer surface of the bend portion 104 of the support frame 100. After making the connection at the first tool-less connector 32 (as described above), the consumer may then couple the fender 30 to the support frame 100. To this end, the consumer will guide the spring arms 126, 128 into the aperture 109 in the bend portion 104 of the support frame 100, illustrated by arrow B in FIG. 4A. As the fender 30 is further moved in the direction of arrow B, the angled, upper arm portions 132 of the spring arms 126, 128 engage the sides of the aperture 109 and flexes the spring arms 126, 128 toward each other (e.g., through a camming action). When the upper arm portions 132 clear the aperture 109 in the support frame 100, the spring arms 126, 128 spring outwardly under their own bias such that the upper arm portions 132 are now outboard of the aperture 109 in the support frame 100 (FIG. 4C). The consumer may optionally tighten the fasteners that couple the support frame 100 to the front fork 24 of bicycle 10 such that the support frame 100 is no longer rotatable relative to the front fork 24. With this snap fit of spring clip 110, the fender 30 is secured to the bicycle 10 and further movement of the fender 30 relative to the bicycle 10 is substantially restricted.

For example, should the consumer try to continue moving the fender 30 in the inward direction (e.g., in the direction of arrow B), the spring clip 110 would engage the outer surface of the support frame 100, and more particularly the bend portion 104 thereof, thus restricting further movement in this direction. Should the consumer attempt to move the fender 30 in the outward direction (e.g., opposite to the direction shown by arrow B), the upper arm portion 132 of the spring arms 126, 128 would engage the inner surface of the support frame 100 along bend portion 104, thus restricting movement in this direction. Once the fender 30 is coupled to the support frame 100, it is intended to remain attached to the bicycle 10. However, should one want to remove the fender 30 from the support frame 100, it can be done. As best illustrated in FIG. 4C, to remove the fender 30 from the support frame 100, the consumer may squeeze the spring arms 126 together until the upper arm portions 132 fit back through the aperture 109 in the support frame 100. Once the spring arms 126 have cleared the aperture 109, the consumer may then pull the fender 30 in the outward direction (e.g., opposite to the direction of arrow B) until the spring clip 110 no longer engages with the support frame 100, at which point the fender 30 may be separated from the support frame 100.

Figure 5:
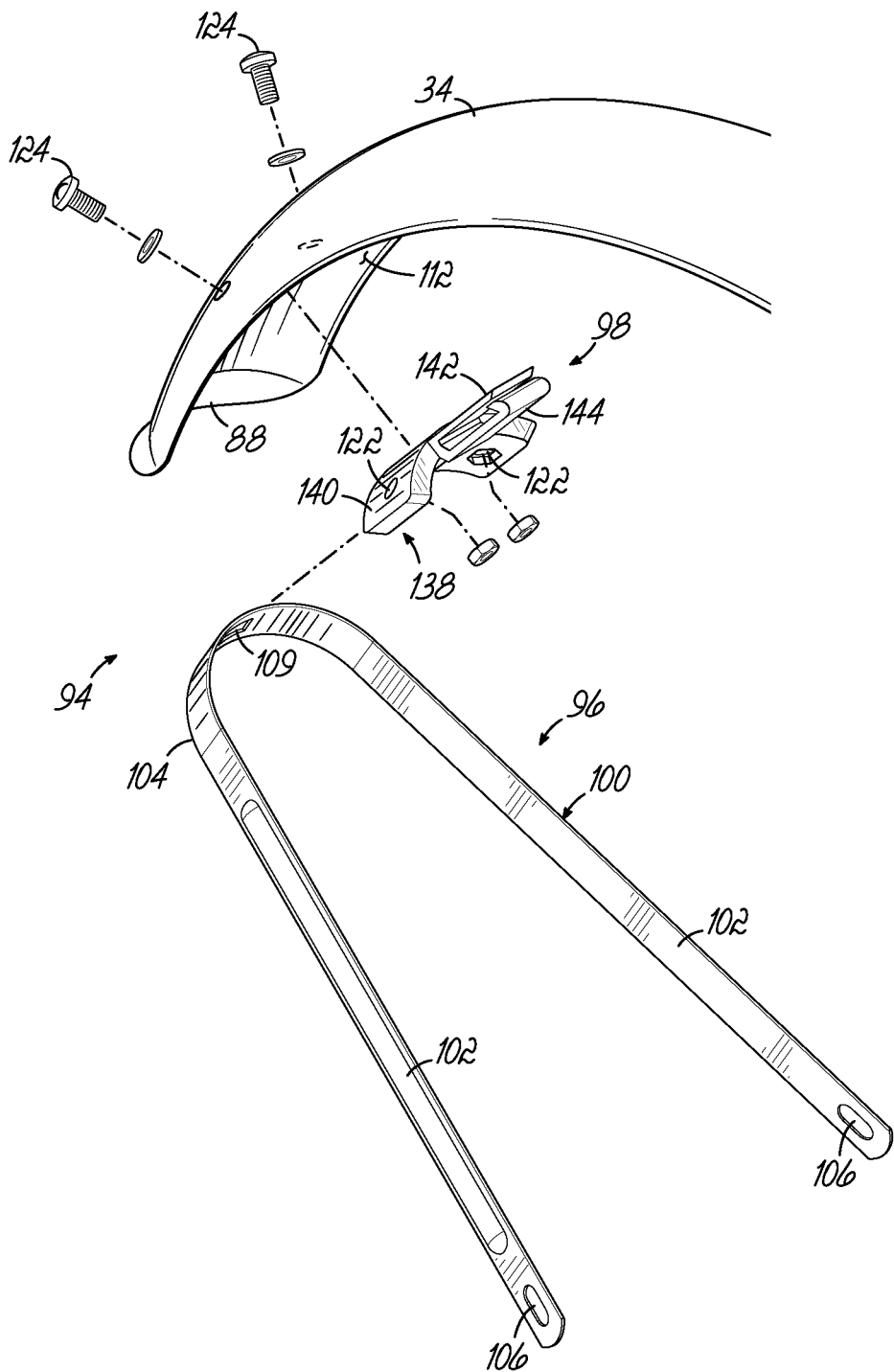
FIG. 5 is a disassembled view of a second tool-less connector for coupling the fender to the bicycle in accordance with another embodiment.

As shown in FIG. 5, in an alternative embodiment the fender connection portion 98 may include a different spring clip 138 configured to be coupled to the lower surface 112 of the fender 30. The spring clip 138 includes a generally arcuate base 140 having first and second opposed ends and an intermediate portion disposed therebetween. The arcuate base 140 is shaped to generally correspond to the transverse cross-sectional shape of the fender 30. Each of the ends includes an aperture 122 for receiving a fastener 124 for securing the spring clip 138 to the lower surface 112 of the fender 30. The intermediate portion of the base 130 includes a pair of arms 142, 144 projecting from and edge of the base 140 and generally along the lower surface 112 of the fender 30 (i.e., approximately parallel to the lower surface 112 of the fender 30) when the spring clip 138 is coupled to the fender 30. This is in contrast to spring clip 110, wherein the spring arms 126, 128 extend generally perpendicular to the lower surface 112 of the fender 30.

In an exemplary embodiment, the arms 142, 144 generally overlie each other with the first arm 142 being adjacent to the lower surface 112 of the fender 30 and the second arm 144 being adjacent to the first arm 142. The first arm 142 may be generally planar. The second arm 144, however, may be J-shaped defining a hooked end. In an exemplary embodiment, at least one of the arms 142, 144 is a flexible spring arm. For example, the first arm 142 may be generally rigid while the second arm 144 may be a flexible spring arm. In an alternative embodiment, both arms 142, 144 may be flexible spring arms. The arms 142, 144 may be positioned relative to each other to define a slight gap 146 therebetween. In one embodiment, the arms 142, 144 may be integrally formed with the spring clip 138. Alternatively, the arms 142, 144 may be separately formed and coupled to the spring clip 138. The spring clip 138 may be formed from metal or a suitable plastic material.

Figure 6A:
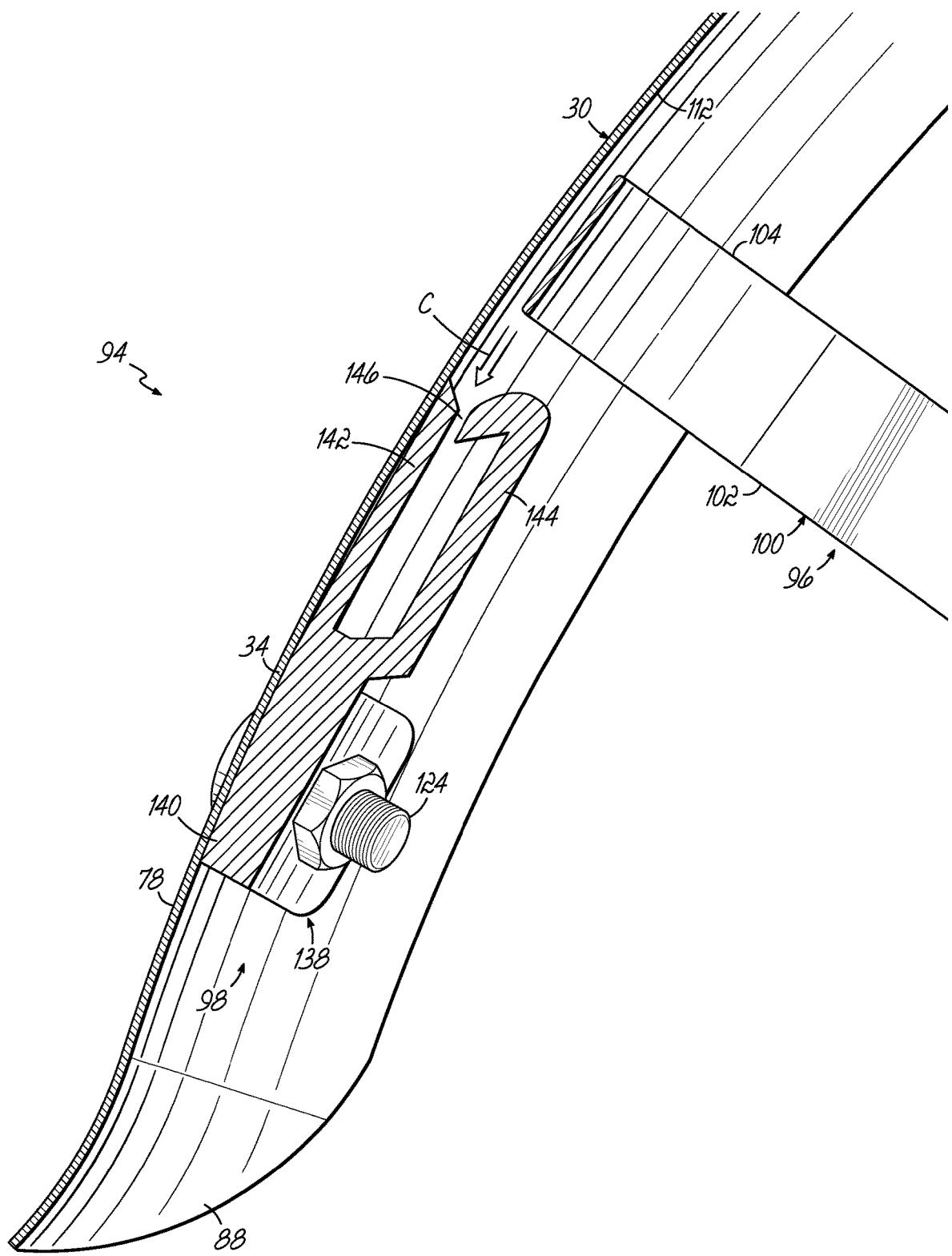
FIGS. 6A-6C are partial cross-sectional views of the second tool-less connector shown in FIG. 5.
Figure 6B:
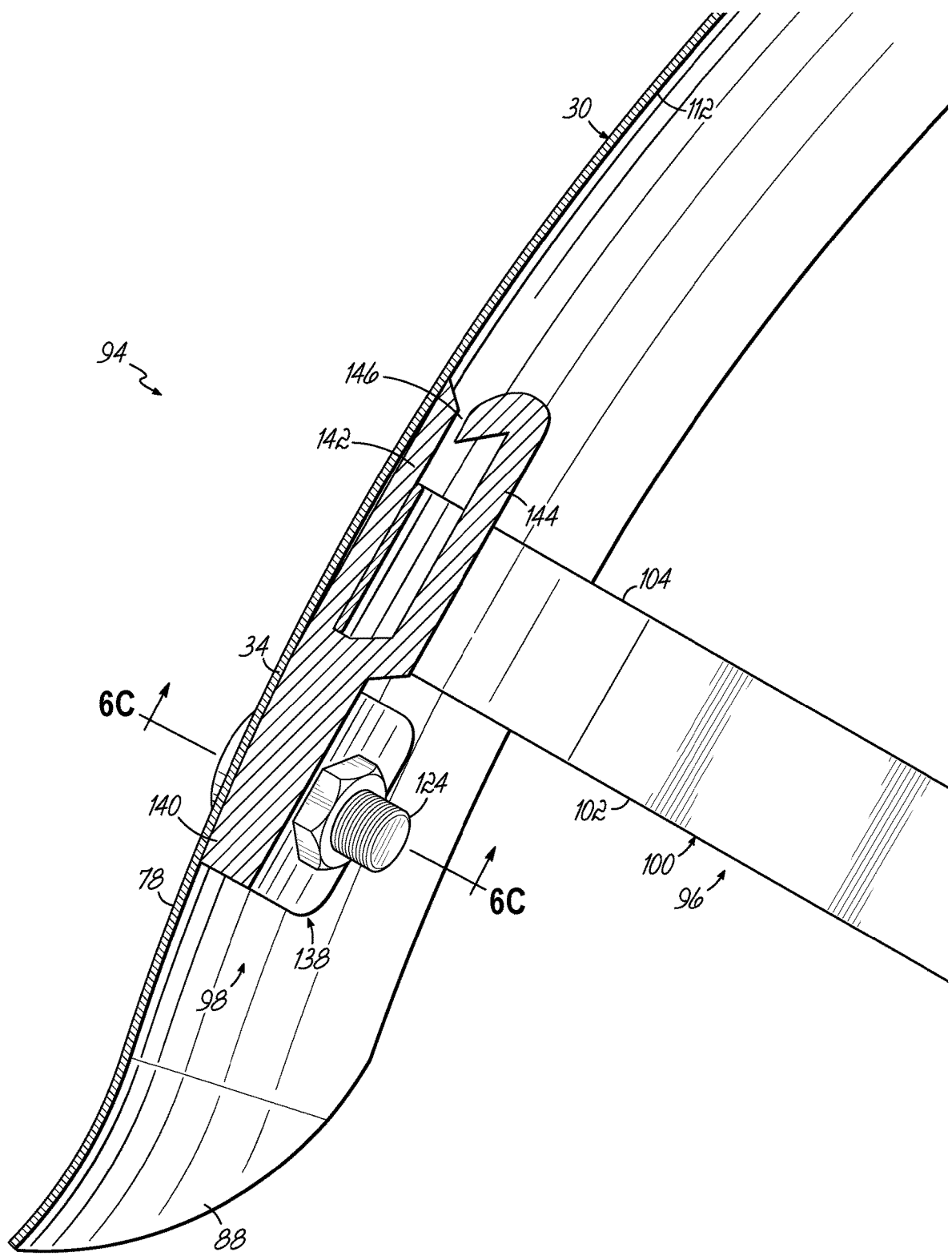
Figure 6C:
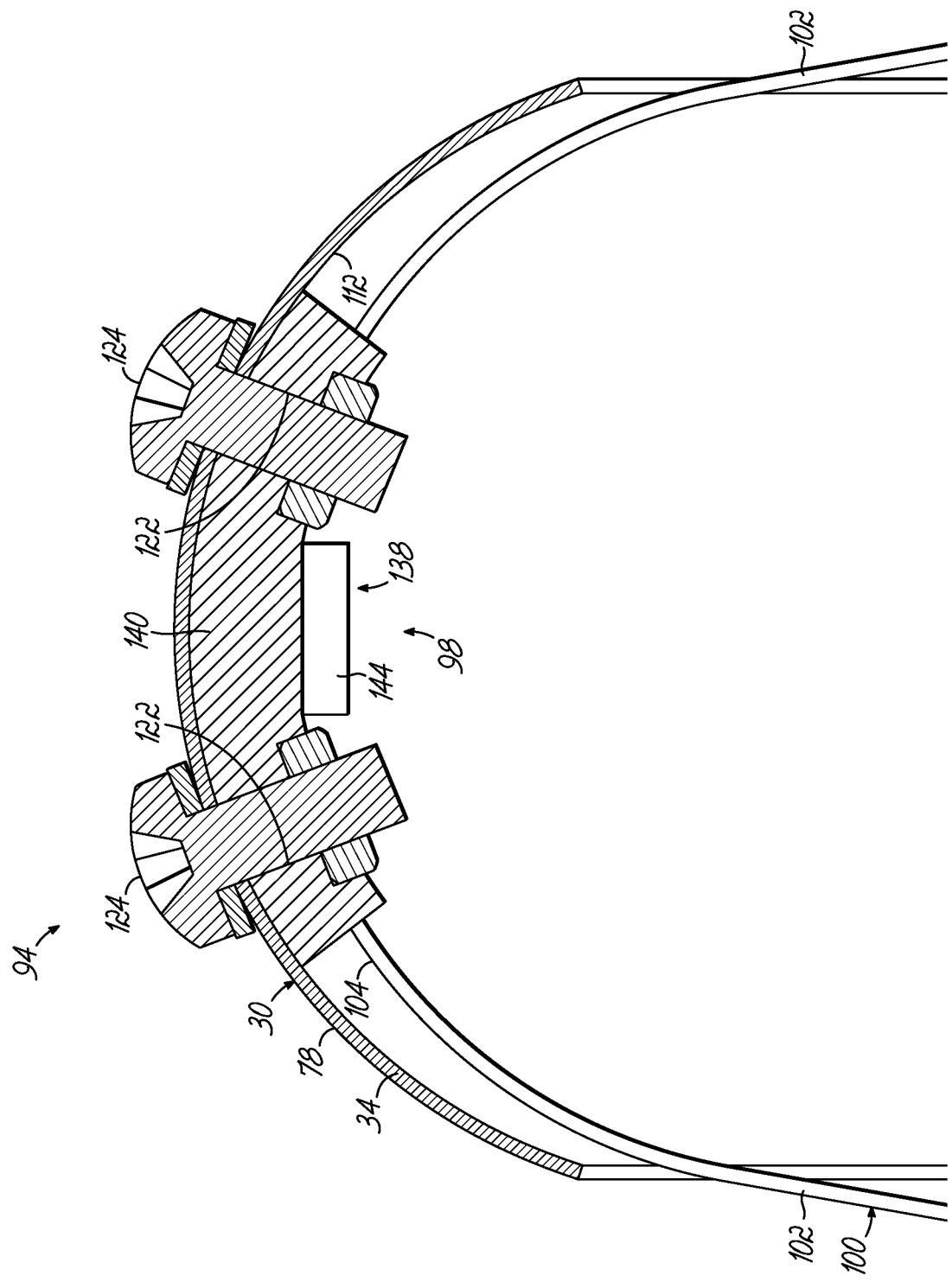

Operation of the second tool-less connector 94 with spring clip 138 for coupling the fender 30 to the bicycle 10 will now be described in detail with reference to FIGS. 6A-6C. In one embodiment, when the consumer receives the packaged bicycle, the bike connector portion 96 will come pre-assembled on the bicycle from the factory. Thus, the free ends of the support frame 100 will be coupled to the eyelets 108 on the front fork 24 of the steering assembly 18, such as by a suitable fastener. The fastening may be such as to allow the support frame 100 to be pivotable about the eyelets 108. In this way, when packaged, the legs 102 of the support frame 100 may be arranged adjacent and generally parallel to the legs 56 of the front fork 24. However, when the consumer is ready to assemble the fender 30 to the bicycle 10, the support frame 100 may be rotated away from the front fork 24 and in a position to connect to the spring clip 138. Furthermore, when the consumer receives the packaged bicycle, the spring clip 138 will come pre-assembled to the lower surface 112 of the fender 30 via the pair of fasteners 124, such as a pair of nuts and bolts, which are received through a pair of apertures in the fender 30 and the apertures 122 in the spring clip 138. Again, however, the fender 30 will not come pre-assembled from the factory and the consumer will have to attach the fender 30 to the bicycle 10.

This process was described above for the first too-less connector 32. During that process, and when the hood 74 is adjacent the bracket 40, the bend portion 104 of the support frame 100 is configured to be adjacent but below the spring clip 138 on the fender 30. As the fender 30 is being inserted between the legs 56 of the front fork 24, the fender 30 is configured to be above the support frame 100 such that the lower surface 112 of the fender 30 generally confronts the outer surface of the bend portion 104 of the support frame 100. After making the connection at the first tool-less connector 32 (as described above), the consumer may then couple the fender 30 to the support frame 100. To this end, the consumer will rotate the support frame 100 toward the spring clip 138, illustrated by arrow C in FIG. 6A. As the support frame 100 is further rotated in the direction of arrow C, the edge of the support frame 100 engages at least one of the terminating ends of the arms 142, 144 and is guided into the gap 146 defined between the two arms 142, 144. With further rotation of the support frame 100, at least one of the arms 142, 144 flexes away from the other arm 142, 144 to allow the support frame 100 to pass between the two arms 142, 144 (e.g., through a camming action). When the support frame 100 clears the terminating ends of the arms 142, 144, the arms 142, 144 move back toward each other under a spring bias to thereby capture the support frame 100 between the two arms 142, 144. With this snap fit, the fender 30 is secured to the bicycle 10 and further movement of the fender 30 relative to the bicycle 10 is substantially restricted.

For example, should the consumer try to continue moving the support frame 100 in the counterclockwise direction (e.g., in the direction of arrow C), the support frame 100 would engage the base 140 of the spring clip 138, thus restricting further movement in this direction. Should the consumer attempt to move the support frame 100 in the clockwise direction (e.g., opposite to the direction shown by arrow C), the support frame 100 would engage the inner surface of the J-shaped end of the arm 144, thus restricting movement in this direction. Once the fender 30 is coupled to the support frame 100, it is intended to remain attached to the bicycle 10. However, should one want to remove the fender 30 from the support frame 100, it can be done. As best illustrated in FIG. 6B, to remove the fender 30 from the support frame 100, the consumer may flex the second arm 144 away from the first arm 142 so as to allow the support frame 100 to pass back through the gap 146 defined between the two arms 142, 144. Once the support frame 100 has cleared the arms 142, 144, the fender 30 may be separated from the support frame 100.

In accordance with an aspect of the invention and as described above, a fender 30 may be coupled to a bicycle 10 in a tool-less manner. More particularly, the bicycle 10 includes a fender assembly 12 having first and second tool-less connectors 32, 94 that secure the fender 30 to the bicycle 10. These snap-fit connectors allow the fender 30 to be coupled to the bicycle 10 in a simple manner and without the use of tools. It is believed that such an improved connection of this bicycle accessory will decrease assembly errors, reduce product return, and improve overall consumer satisfaction.

Figure 7:
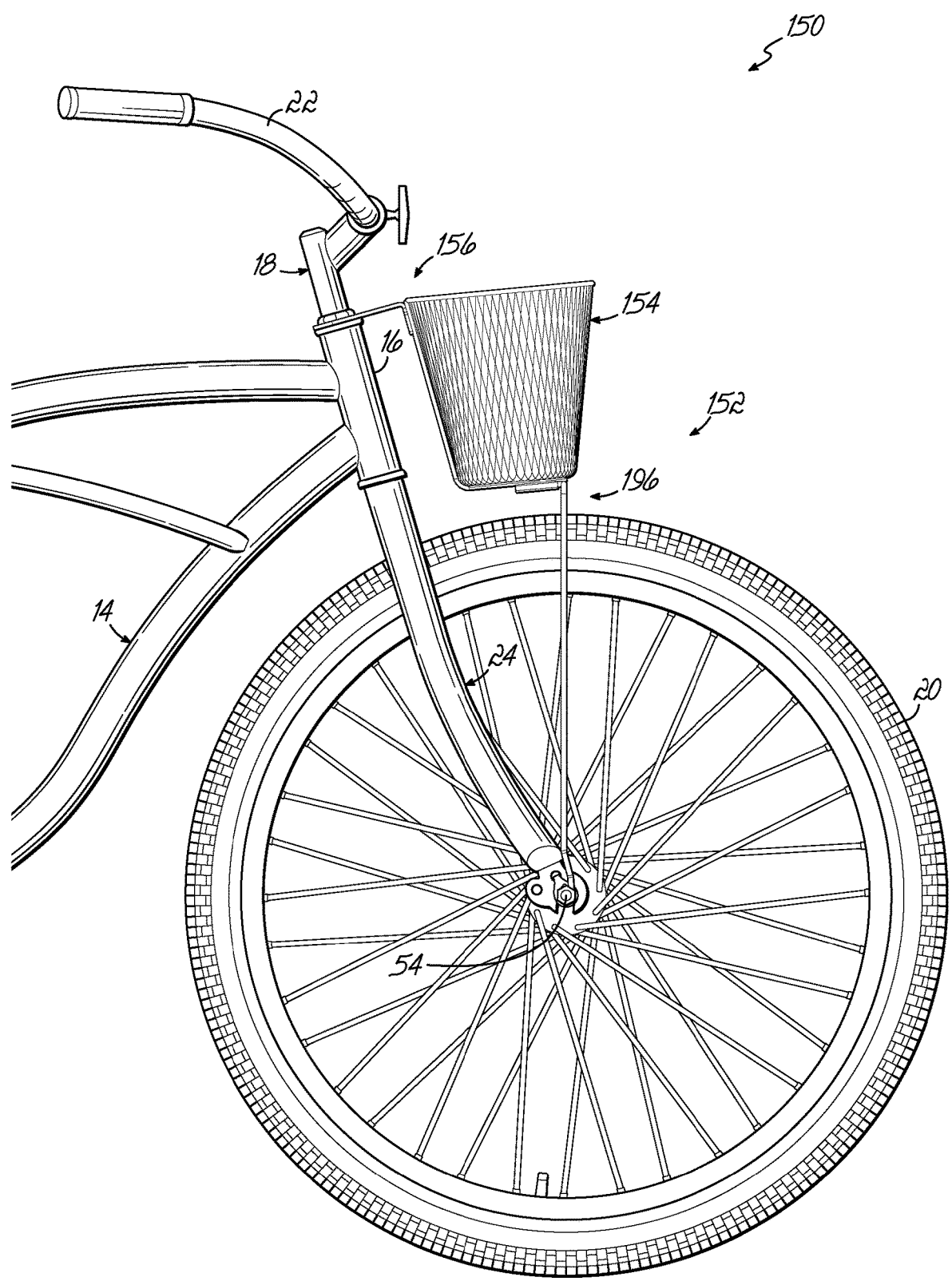
FIG. 7 is a partial side view of a bicycle having a tool-less basket assembly in accordance with an embodiment of the invention.

Referring now to the drawings and to FIG. 7 in particular, a bicycle 150 having a tool-less basket assembly 152 is shown. As in conventional designs, the bicycle 150 generally includes a main frame 14 having a head tube 16 configured to receive a rotatable steering assembly 18 coupled to a front wheel 20 for guiding the bicycle 10 in a desired direction. The steering assembly 18 includes a handlebar 22 configured to be grasped or engaged by the rider, and a front fork 24 coupled to the handlebar 22 and to which the front wheel 20 is coupled. In an exemplary embodiment, the bicycle 150 includes a front basket assembly 152 that allows the rider to carry various items on the bicycle 150. Additionally, the basket assembly 152 may be considered desirable by many consumers for improving the overall aesthetics of the bicycle 150.

Figure 8:
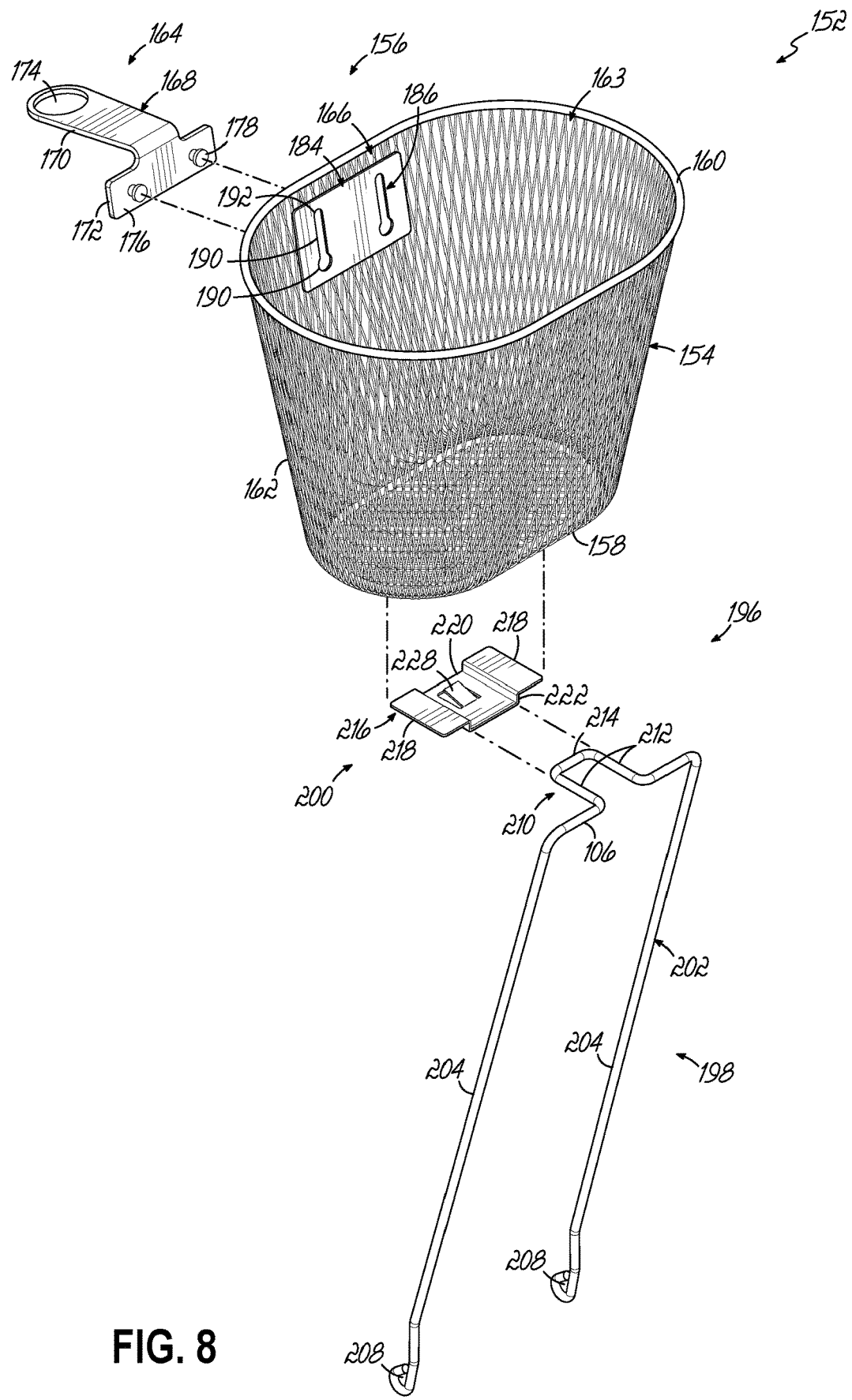
FIG. 8 is a disassembled view of the tool-less basket assembly illustrated in FIG. 5.

In one embodiment and as illustrated in FIGS. 7 and 8, the basket assembly 152 includes a basket 154 and at least one tool-less connector 156 (referred to herein as the first tool-less connector) for coupling the basket 154 to the bicycle 150, and more particularly to the steering assembly 18 thereof. The basket 154 may include a bottom wall 158, an upper rim 160, and one or more sidewalls 162 extending between the bottom wall 158 and upper rim 160. The upper rim 160 defines an opening for accessing a cavity 163 defined by the bottom wall 158 and the at least one sidewalls 162. In one embodiment, the basket 154 may have a generally circular or oval configuration as shown. In an alternative embodiment, however, the basket 154 may have other shapes, such as a generally rectangular shape. The basket 154 may be formed from plastic, metal, wood, or other materials. Additionally, the basket 154 may be generally solid (not shown). Alternatively, the basket 154 may be configured as a mesh or weave, as shown in FIGS. 7 and 8 for example.

The first tool-less connector 156 includes a bike connector portion 164 and a basket connector portion 166, wherein the two portions 164, 166 cooperate to couple the basket 154 to the bicycle 150 in a tool-less manner. In this regard, the bike connector portion 164 includes a bracket 168 configured to be coupled to the steering assembly 18. In one embodiment, the bracket 168 may be configured as a L-shaped bracket having a first leg 170 and a second leg 172 extending generally orthogonally therefrom. More particularly, the first leg 170 of the bracket 168 may include an aperture 174 configured to receive a portion of the steering assembly 18 adjacent the top of the head tube 16 therethrough in a snug fit (e.g., such as at the top bearing). The first leg 170 extends away from the head tube 16 in a direction generally aligned with the front wheel 20. The second leg 172 extends generally downwardly from the end of the first leg 170 and has a width greater than the width of the first leg 170 such that the bracket 168 has a bent T shape, as illustrated in FIG. 8. The second leg 172 includes an outer surface 176 from which projects at least one stud 178, and preferably two or more studs 178 (two shown) transversely spaced along the second leg 172. Each stud 178 includes a shaft 180 coupled to the outer surface 176 at one end and having an enlarged head 182 at the other end thereof.

As illustrated in FIG. 8, the basket connector portion 166 includes a connector plate 184 formed in or attached to the at least one sidewall 162 along a rear side of the basket 154. In an exemplary embodiment, the connector plate 184 includes at least one through slot 186, and preferably two or more through slots 186 (two shown) transversely spaced along the connector plate 184. In one embodiment, the through slots 186 extend in a generally vertical direction. Each through slot 186 may be thermometer shaped having an enlarged lower portion 188 and a more narrow straight portion 190 open to the enlarged portion 188 at a lower end thereof and extending away therefrom to an upper closed end 192.

Figure 9A:
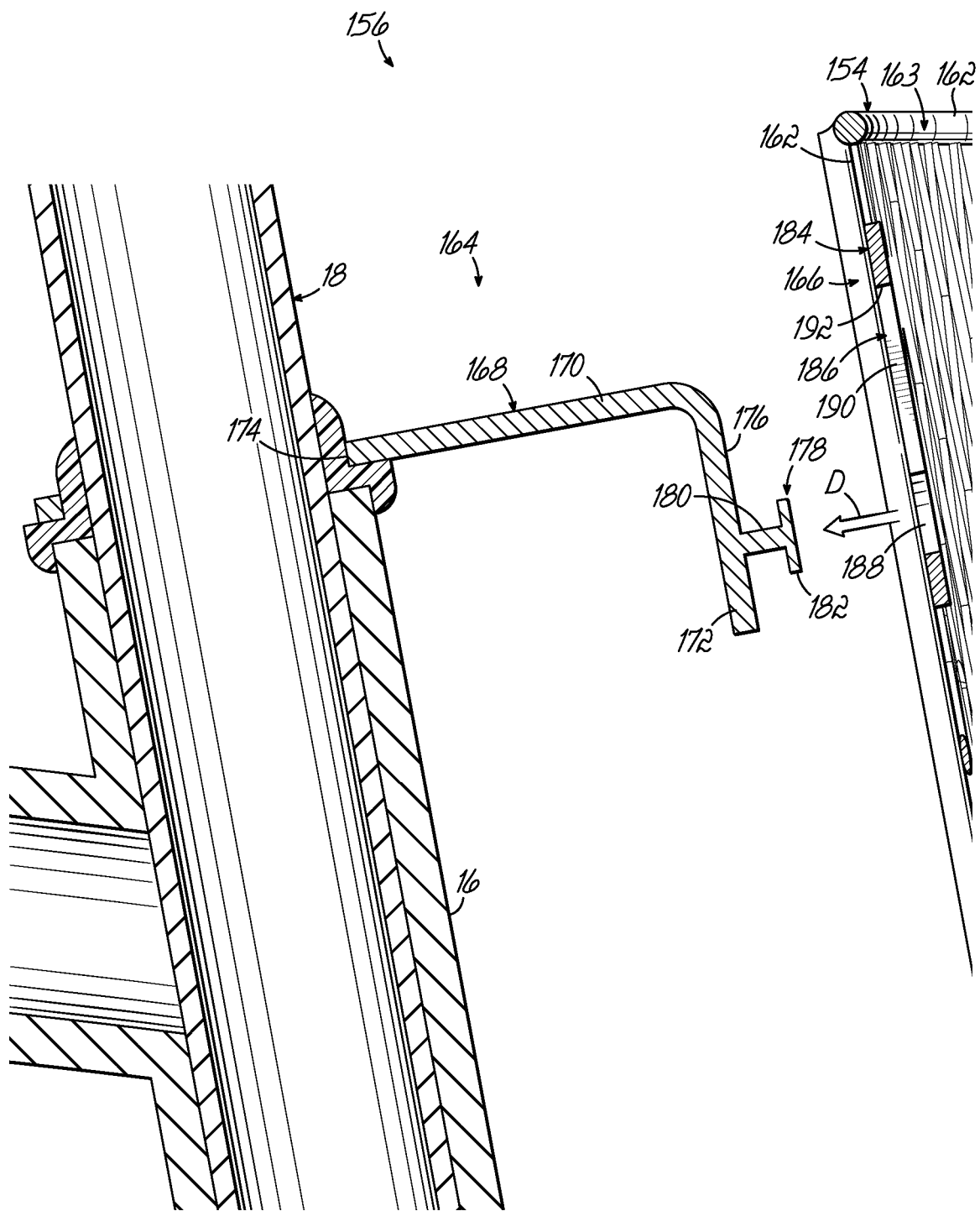
FIGS. 9A-9C are partial cross-sectional views of a first tool-less connector for coupling a basket to the bicycle.

Operation of the first tool-less connector 156 for coupling the basket 154 to the bicycle 150 will now be described in detail with reference to FIGS. 9A-9C. In one embodiment, when a consumer receives the packaged bicycle, the bike connector portion 164 will come pre-assembled on the bicycle 10 from the factory. Thus, the bracket 168 will come assembled to the steering assembly 18 (but without the handlebar 22 attached). However, the basket 154 will not come pre-assembled from the factory and the consumer will have to attach the basket 154 to the bicycle 150. To do this, the consumer will first orient the basket 154 so that the connector plate 184 of the basket 154 faces the bracket 168 on the bicycle 150, and then move the basket 154 in the direction of the bracket 168, as illustrated by arrow D in FIG. 9A.

Figure 9B:
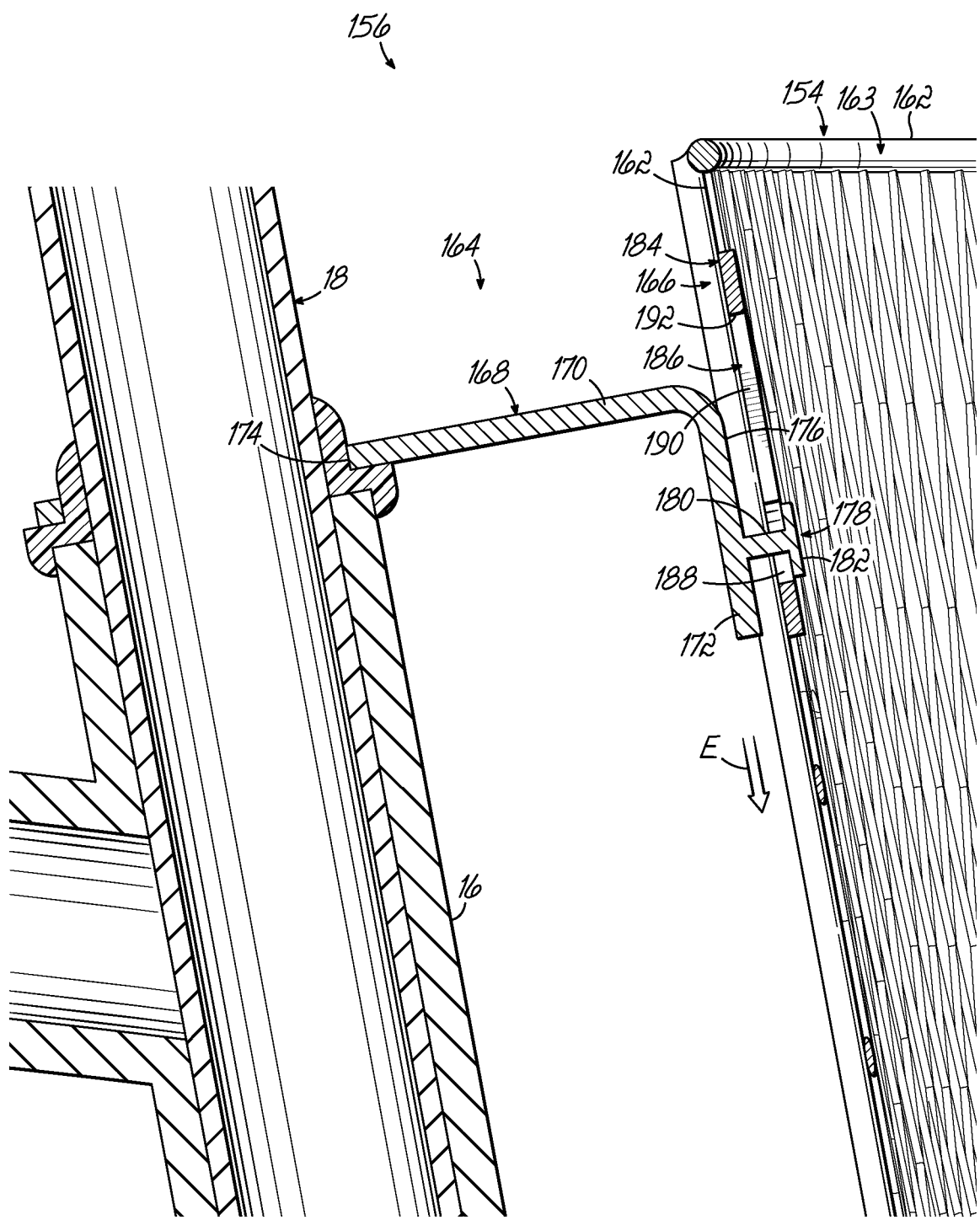
Figure 9C:
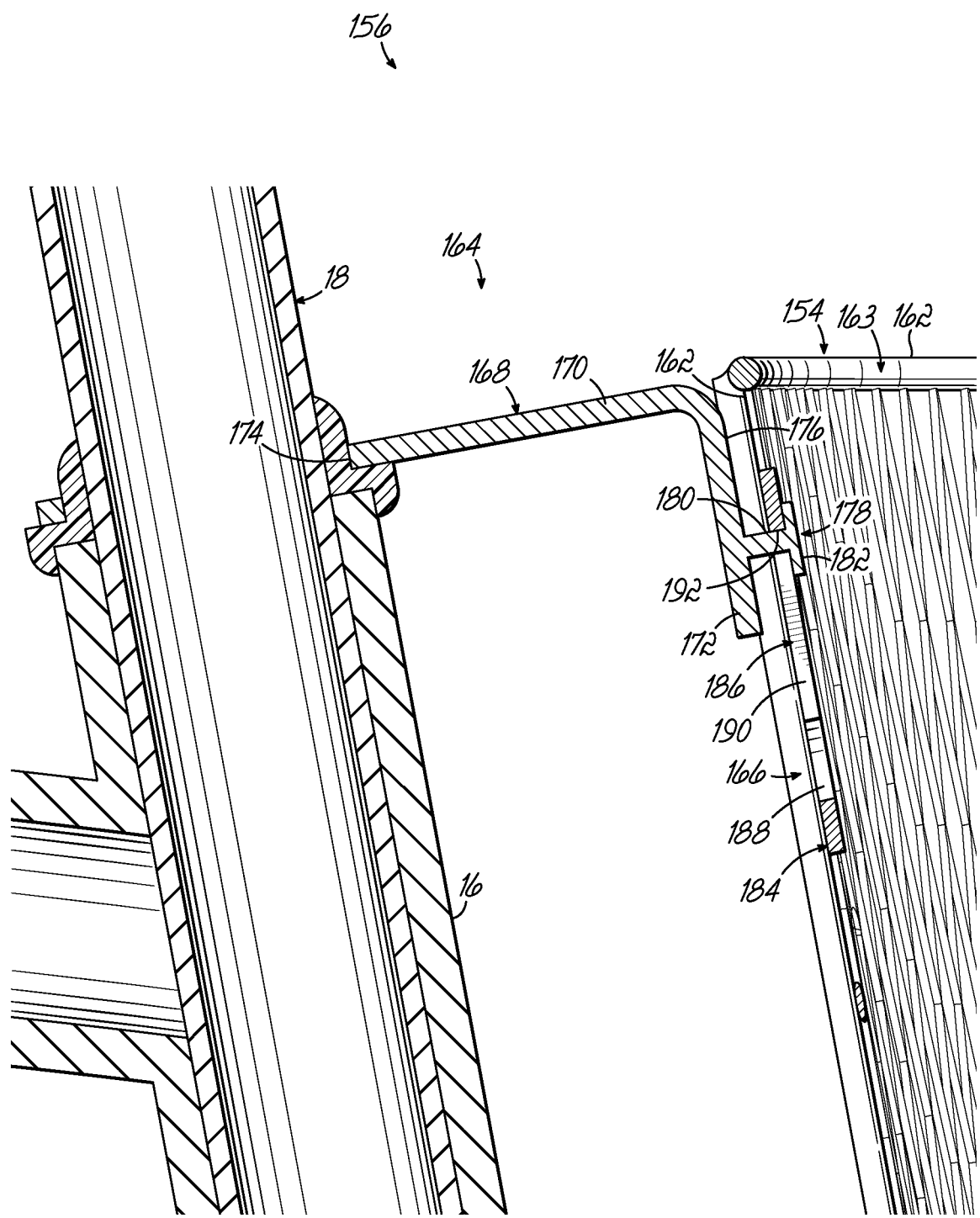

As illustrated in FIG. 9B, as the basket 156 is further moved toward the bracket 168, the heads 182 and a portion of the shafts 180 of the studs 178 extend through the enlarged portion of the through slots 186 in the connector plate 184 and the outer surface 194 of the connector plate 184 engages the outer surface 176 of the second leg 172 of the bracket 168. At this point, the consumer then pushes the basket 156 downwardly so that the studs 178 start traversing the more narrow straight portions 190 of the through slots 186, as illustrated by arrow E in FIG. 9B. The shafts 180 of the studs 178 are sized to provide a snug fit within the straight portions 190 of the through slots 186. With further movement of the basket 156 in the downward direction, the shafts 180 of the studs 178 will engage the closed end 192 of the through slots 186. The weight of the basket 156 (and its contents) as well as the friction fit of the studs 178 within the through slots 186 are configured to secure the basket 154 to the bicycle 10 and further movement of the basket 154 relative to the bicycle 10 is substantially restricted.

Once the basket 154 is coupled to the bicycle 150, it is intended to remain attached to the bicycle 150. However, should one want to remove the basket 154 from the bicycle 150, it can be done. As best illustrated in FIG. 9C, to remove the basket 154, the consumer may apply a threshold force, dictated by weight and the friction fit between the studs 178 and the slots 186, in an upward direction (e.g., opposite to the direction of arrow E) so that the studs 178 start traversing the narrow portions 190 of the through slots 186. The movement in the upward direction may continue until the studs 178 are positioned in the enlarged portions 188 of the through slots 186. At this point, the consumer may then move the basket 154 in an outward direction (e.g., opposite to the direction of arrow D) until the studs 178 clear the through slots 186, at which point the basket 154 may be separated from the bicycle 150.

While in certain applications, it may be sufficient to include only one tool-less connection with the basket assembly 152, in an exemplary embodiment, the basket assembly 152 may further include a second means for coupling the basket 154 to the bicycle 150. This may improve the support for the basket 154 and may improve the securement of the basket 154 to the bicycle 150. In this regard, the basket assembly 152 may include a second tool-less connector 196 for coupling the basket 154 to the bicycle 150. The second tool-less connector 196 includes a bike connector portion 198 and a basket connector portion 200, wherein the two portions 198, 200 cooperate to couple the basket 154 to the bicycle 150 in a tool-less manner.

In this regard, the bike connector portion 198 includes a support frame 202 having a pair of opposed, generally spaced-apart legs 204 and a cross portion 206 coupling one end of the legs 204. The opposite ends of the legs 204 are free ends and include an aperture 208 for coupling the support frame 202 to the bicycle 10. The free ends of the legs 204 may include a closed or partially closed loop for defining the aperture 208. In an exemplary embodiment, the free ends of the legs 204 may be configured to couple to the front wheel 20 (e.g., to the axle thereof) and be secured to the bicycle 150 using the wheel nuts, quick release mechanism or other connector that secures the front wheel 20 to the bicycle 150. Alternatively, the free ends of the legs 204 may be configured to couple to eyelets (not shown) attached to the steering assembly 18 adjacent to where the front wheel 20 attaches to the bicycle 150 via suitable fasteners. Moreover, the cross portion 206 may include a generally U-shaped tab 210 projecting out of the plane defined by the legs 204 (e.g., substantially perpendicular to such a plane). In one embodiment, the support frame 202 may be formed from a rod and the tab 210 may include a pair of side bars 212 and a cross bar 214, as illustrated in FIG. 8.

As shown in FIG. 8, the basket connector portion 200 includes a connector plate 216 configured to be coupled to the outer surface of the bottom wall 158 of the basket 154. The connector plate 216 may be integrated into the basket 154 or be a separate element which is coupled to the basket 154, such as by welding, bonding, etc. In an exemplary embodiment, the connector plate 216 includes two side lands 218 that interface with the outer surface of the bottom wall 158, and a central land 220 disposed therebetween which is spaced from the side lands 218 by an offset 222 to define an opening 224 accessing an internal cavity 226. The central land 220 further includes a flexible tongue 228 which in an unbiased state projects rearwardly (e.g., away from the opening 224) and upwardly into cavity 226. However, the tongue 228 may be flexed downwardly so as to essentially lie within the plane defined by the central land 220. In an exemplary embodiment, the tongue 228 may be integrally formed with the central land 220. Alternatively, the tongue 228 may be a separate element coupled to the connector plate 216 (not shown) but otherwise projecting into the cavity 226 as described above.

Figure 10A:
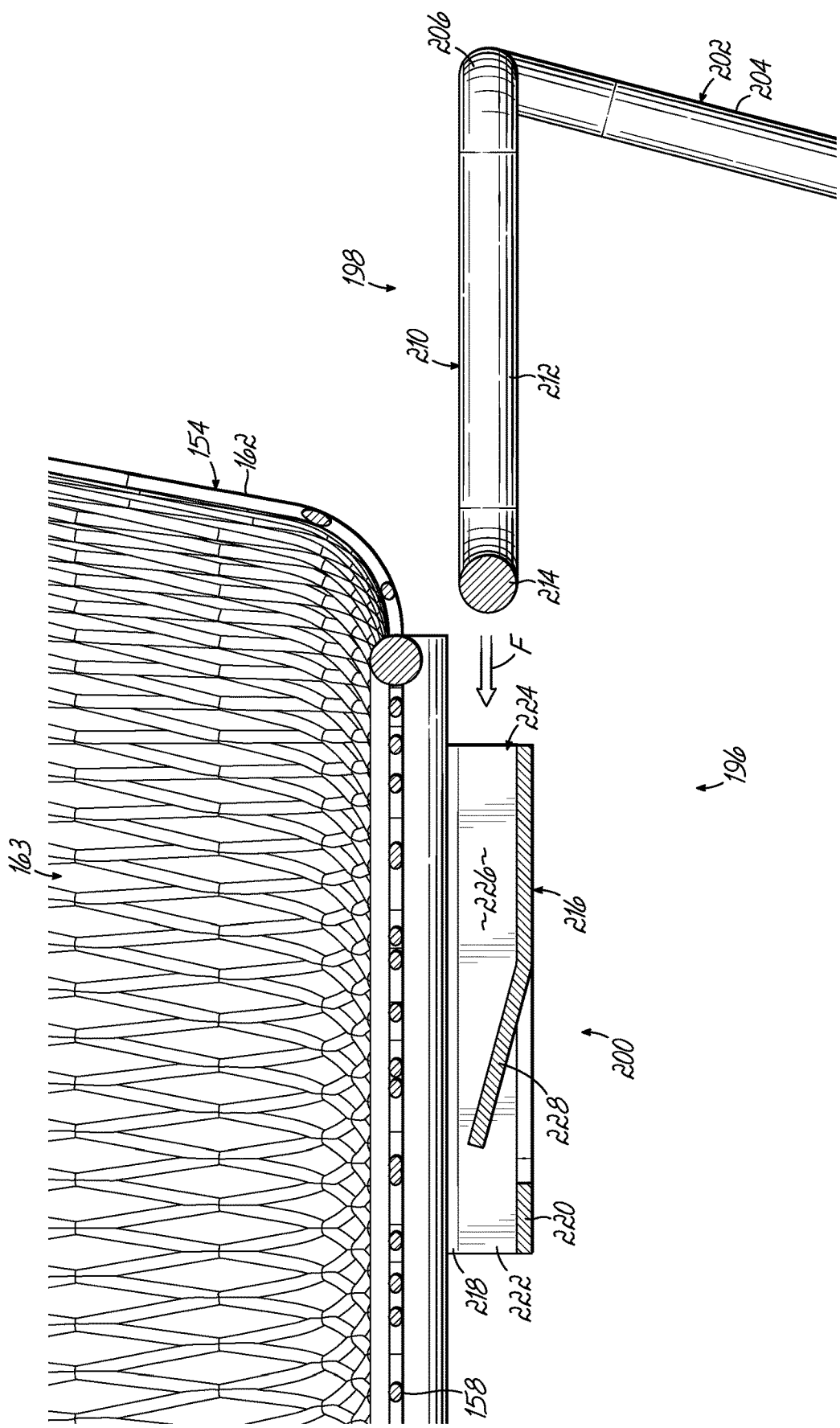
FIGS. 10A-10C are partial cross-sectional view of a second tool-less connector for coupling the basket to the bicycle.
Figure 10B:
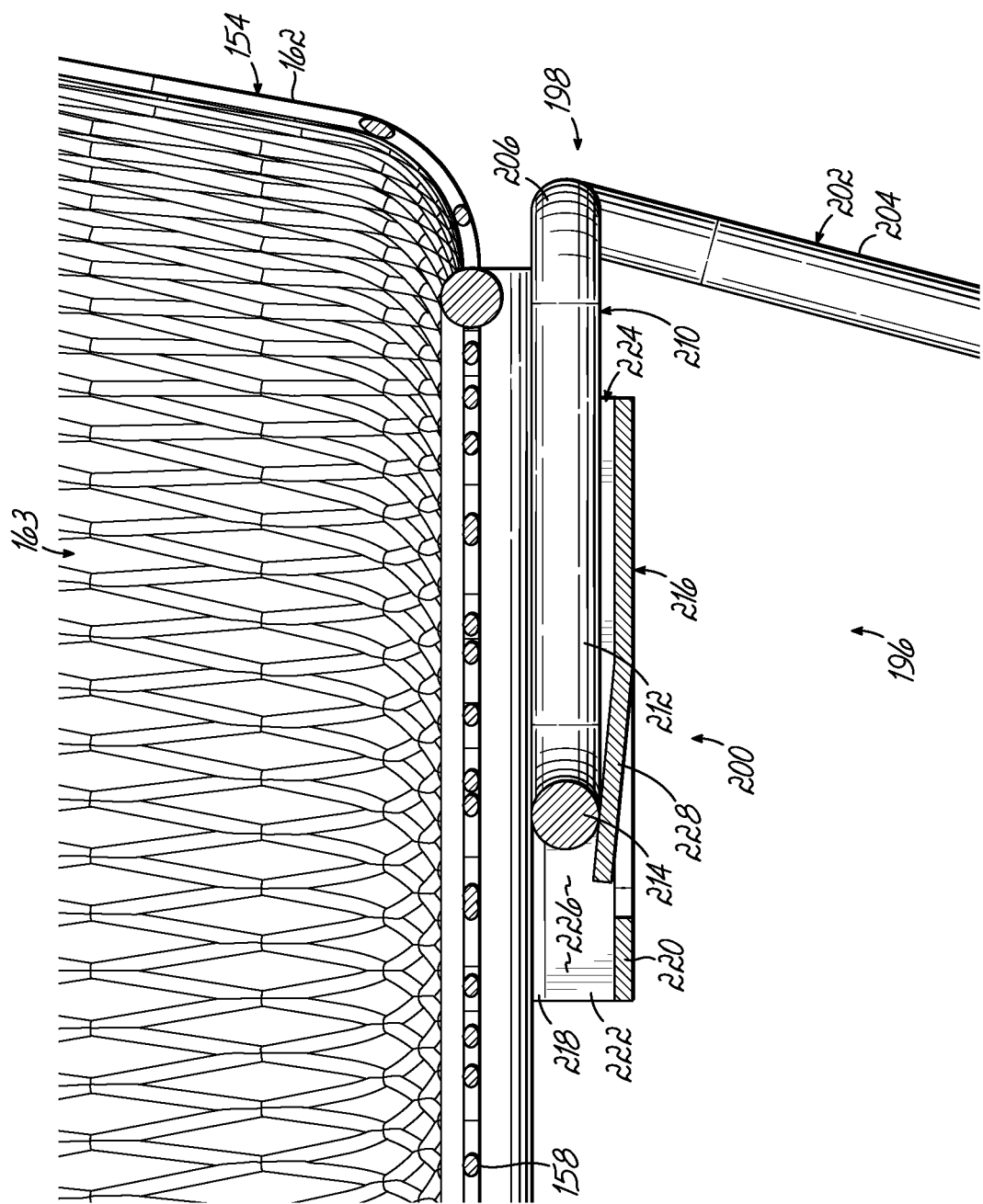
Figure 10C:
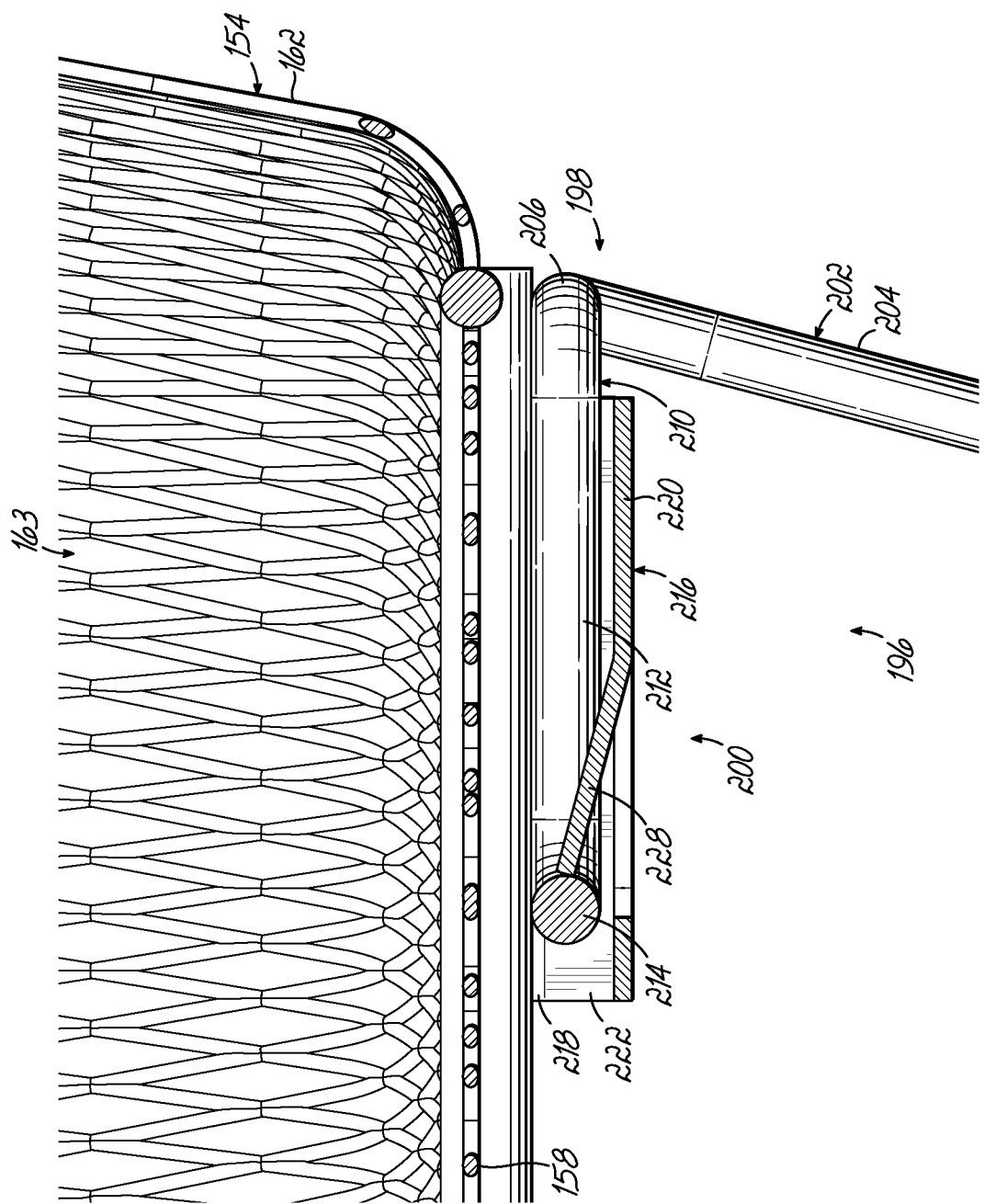

Operation of the second tool-less connector 196 for coupling the basket 154 to the bicycle 150 will now be described in detail with reference to FIGS. 10A-10C. In one embodiment, when the consumer receives the packaged bicycle, the basket connector portion 200, and more particularly the connector plate 216, will come pre-assembled on the outer surface of the bottom wall 158 of the basket 156 from the factory. Furthermore, in one embodiment, when the consumer receives the packaged bicycle, the support frame 202 may come pre-assembled to the front wheel 20. Alternatively, the support frame 202 may not come pre-assembled to the front wheel 20 and the consumer will have to couple the free ends of the legs 204 of the support frame 202 to the front wheel 20. In any event, the front wheel 20 may be loosely coupled to the bicycle 150 in the normal course such that the support frame 202 is pivotable about the axle of the front wheel 20. If the bicycle 150, and more particularly the steering assembly 18 thereof, includes eyelets adjacent to where the front wheel 20 attaches to the bicycle 150, the support frame 202 may come pre-assembled to the bicycle 150. In this case, the support frame 202 may remain pivotable about the eyelets on the bicycle 150. Again, however, the basket 154 will not come pre-assembled from the factory and the consumer will have to attach the basket 154 to the bicycle 150.

This process was described above for the first too-less connector 156. After making the connection at the first tool-less connector 156, the consumer may then couple the basket 154 to the support frame 202. To this end, the consumer will rotate the support frame 202 in a counter-clockwise direction and toward the basket 154, as illustrated by arrow F in FIG. 10A. As the support frame 202 is further moved in the direction of arrow F, the tab 210 extends through the opening 224 and into the cavity 226 of the connector plate 216. As illustrated in FIG. 10B, with further movement the cross bar 214 of the tab 210 engages the tongue 228 and flexes the tongue 228 downwardly (e.g., through a camming action). When the cross bar 214 of the tab 210 clears the end of the tongue 228, the tongue 228 springs upwardly under its own bias so as to be positioned between the two side bars 212 of the tab 210 (FIG. 10C). With this snap fit, the basket 154 is secured to the bicycle 150 and further movement of the basket 150 relative to the bicycle 10 is substantially restricted.

For example, should the consumer try to continue moving the support frame 202 in the rearward direction (e.g., in the direction of arrow F), the cross bar 214 of the support frame 202 would engage the offset 222 of the connector plate 216, thus restricting further movement in this direction. Should the consumer attempt to move the support frame 202 in the forward direction (e.g., opposite to the direction shown by arrow F), the cross bar 214 of the tab 210 would engage the tongue 228, thus restricting movement in this direction. Once the basket 154 is coupled to the support frame 202, it is intended to remain attached to the bicycle 150. However, should one want to remove the basket 154 from the support frame 202, it can be done. As best illustrated in FIG. 10C, to remove the basket 154 from the support frame 202, the consumer may insert a thin knife edge through the opening 224 and into the cavity 226 so as to be below the tab 210. This will flex the tongue 228 downwardly and allow the cross bar 214 of the tab 210 to move back out of the cavity 226 with movement of the support frame 202 in the forward direction (e.g., opposite to the direction shown by arrow F). Once the cross bar 214 clears the tongue 228, the consumer may then continue to move the support frame 202 in the forward direction until the tab 210 no longer engages with the connector plate 216, at which point the basket 154 may be separated from the support frame 202.

In accordance with an aspect of the invention and as described above, a basket 154 may be coupled to a bicycle 150 in a tool-less manner. More particularly, the bicycle 150 includes a basket assembly 152 having first and second tool-less connectors 156, 196 that secure the basket 154 to the bicycle 150. These connectors allow the basket 154 to be coupled to the bicycle 150 in a simple manner and without the use of tools. It is believed that such an improved connection of this bicycle accessory will decrease assembly errors, reduce product return, and improve overall consumer satisfaction.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. As used herein, the term tool-less encompasses nearly tool-less processes (i.e., the minimal use of tools). For example, the tightening of already assembled nuts/bolts using a tool is still considered a tool-less assembly and in the normal course of bicycle maintenance. Thus, the various features of the invention may be used alone or in any combination depending on the needs and preferences of the user.

What is claimed is:

1. A bicycle, comprising:
 a main frame;
 a steering assembly coupled to the main frame;
 a front wheel coupled to the steering assembly; and
 a fender assembly, wherein the fender assembly includes a fender and a first tool-less connector for connecting the fender to the bicycle, wherein the first tool-less connector comprises:
 a bicycle connection portion attached to the steering assembly, wherein the bicycle connection portion includes a bracket with a spring clip connected to the bracket; and
 a fender connection portion on the fender, wherein the fender connection portion includes a hood projecting outwardly and away from the front wheel.

2. The bicycle of claim 1, wherein the spring clip includes a flexible tongue, wherein the hood includes an interior cavity, a first opening, and a second opening, and wherein when the fender is assembled to the bicycle, the bracket is received in the interior cavity of the hood through the first opening and the flexible tongue of the spring clip is received through the second opening of the hood.

3. The bicycle of claim 1, wherein the hood is integrally formed in the fender.

4. The bicycle of claim 1, wherein when the fender is assembled to the bicycle the hood is received between the spring clip and the bracket, and wherein the hood engages a flexible tongue on the spring clip to move the flexible tongue outwardly and away from the front wheel.

5. The bicycle of claim 1, wherein the spring clip is separate from the bracket and is attached to the bracket via a fastener.

6. The bicycle of claim 1, wherein the spring clip attaches to an outer surface of the bracket facing away from the front wheel.

7. The bicycle of claim 1, further comprising a second tool-less connector for connecting the fender to the bicycle in a tool-less manner.

8. The bicycle of claim 7, wherein the second tool-less connector includes a bicycle connection portion on the bicycle and a fender connection portion on the fender, wherein the bicycle connector portion includes a support frame on the steering assembly and the fender connection portion includes spring clip.

9. The bicycle of claim 8, wherein the support frame includes two legs and an intermediate portion having an opening, wherein the spring clip includes at least one flexible arm, and wherein when the fender is assembled to the bicycle, the at least one flexible arm is received in the opening in the intermediate portion of the support frame.

10. The bicycle of claim 9, wherein the spring clip includes two flexible arms and each flexible arm is received in the opening in the intermediate portion of the support frame when the fender is assembled to the bicycle.

11. The bicycle of claim 9, wherein the at least one flexible arm is generally parallel to the fender and flexes in a direction generally perpendicular to the fender.

12. The bicycle of claim 9, wherein the at least one flexible arm is generally perpendicular to the fender and flexes in a direction generally perpendicular to the fender.

\* \* \* \* \*